US011983466B2

(12) United States Patent
Hudson et al.

(10) Patent No.: US 11,983,466 B2
(45) Date of Patent: May 14, 2024

(54) TOOL FOR OBJECT PLACEMENT WITHIN A DEFINED ENVIRONMENT

(71) Applicant: Henry Products Incorporated, Seattle, WA (US)

(72) Inventors: Maxwell Mahler Hudson, Seattle, WA (US); Elton S. Hudson, Vashon, WA (US)

(73) Assignee: HENRY PRODUCTS INCORPORATED, Seattle, WA (US)

( * ) Notice: Subject to any disclaimer, the term of this patent is extended or adjusted under 35 U.S.C. 154(b) by 258 days.

(21) Appl. No.: 17/529,829

(22) Filed: Nov. 18, 2021

(65) Prior Publication Data
US 2023/0153478 A1 May 18, 2023

(51) Int. Cl.
| | | |
|---|---|---|
| *G06F 30/13* | (2020.01) | |
| *G06F 3/0482* | (2013.01) | |
| *G06F 30/12* | (2020.01) | |
| *G06F 3/0486* | (2013.01) | |
| *G06F 111/04* | (2020.01) | |

(52) U.S. Cl.
CPC ............ *G06F 30/12* (2020.01); *G06F 3/0482* (2013.01); *G06F 30/13* (2020.01); *G06F 3/0486* (2013.01); *G06F 2111/04* (2020.01)

(58) Field of Classification Search
CPC ........ G06F 30/12; G06F 3/0482; G06F 30/13; G06F 3/0486; G06F 2111/04; G06F 3/04842; G06F 3/04845; G06F 2203/04806
See application file for complete search history.

(56) References Cited

U.S. PATENT DOCUMENTS

| | | | |
|---|---|---|---|
| 8,255,338 B1 * | 8/2012 | Brittan ................... | G06Q 30/06 705/26.1 |
| 8,260,581 B2 * | 9/2012 | Hoguet ................... | G06F 30/13 715/764 |
| 9,355,470 B2 * | 5/2016 | Merrell ................... | G06T 11/00 |
| 9,910,575 B2 * | 3/2018 | Seuntiens .......... | G06Q 30/0601 |
| 10,025,473 B2 * | 7/2018 | Sarao .................. | G06F 3/04842 |
| 10,712,923 B1 * | 7/2020 | Pathmanathan .... | G06F 3/04815 |
| 10,769,346 B1 * | 9/2020 | Yu .......................... | G06F 3/0486 |

(Continued)

OTHER PUBLICATIONS

Popup Menu feature: Using automatic fillers. Youtube video screenshot. 1 page (Year: 2012).*

(Continued)

*Primary Examiner* — Hien L Duong
(74) *Attorney, Agent, or Firm* — Workman Nydegger

(57) ABSTRACT

Techniques for providing a unique UI and backend service designed to improve item placement within a defined environment are described. The placement of an item within the UI is governed by rules. Measurement data detailing dimensions of an area is received. An item selection menu within the UI is populated with items in a database. A design layout area, which represents the measured area, is displayed. In response to an item being selected from the item selection menu and being placed at a location within the design layout area, a set of rules is triggered. The placement of the item either does not violate the rules or, alternatively, that placement does violate the set rules. If the rules are violated, then alternative suggestions are provided. If the rules are not violated, then the item is placed at the location.

20 Claims, 24 Drawing Sheets

(56) References Cited

U.S. PATENT DOCUMENTS

| | | | | |
|---|---|---|---|---|
| 11,270,034 | B1* | 3/2022 | Shen | G06N 7/01 |
| 2007/0156540 | A1* | 7/2007 | Koren | G06Q 30/0643 |
| | | | | 705/14.51 |
| 2008/0126023 | A1* | 5/2008 | Hoguet | G06F 30/13 |
| | | | | 703/1 |
| 2009/0138113 | A1* | 5/2009 | Hoguet | G06Q 30/02 |
| | | | | 700/98 |
| 2009/0160856 | A1* | 6/2009 | Hoguet | G06F 16/904 |
| | | | | 345/420 |
| 2011/0061011 | A1* | 3/2011 | Hoguet | G06Q 30/0603 |
| | | | | 715/769 |
| 2013/0338974 | A1* | 12/2013 | Kochman | G06F 30/13 |
| | | | | 703/1 |
| 2015/0332511 | A1* | 11/2015 | Jovanovic | G06F 3/0488 |
| | | | | 345/427 |
| 2016/0179315 | A1* | 6/2016 | Sarao | G06F 3/0481 |
| | | | | 715/771 |
| 2018/0308186 | A1* | 10/2018 | Bell | G06Q 20/20 |
| 2019/0005159 | A1* | 1/2019 | Raman | G06F 16/2428 |
| 2021/0117582 | A1* | 4/2021 | Kamenca | G06F 30/13 |
| 2022/0108044 | A1* | 4/2022 | Kalmbach | G06V 10/44 |
| 2022/0139043 | A1* | 5/2022 | Jovanovic | G06T 19/006 |
| | | | | 345/419 |
| 2022/0327264 | A1* | 10/2022 | Murphy | G06N 3/08 |
| 2022/0383600 | A1* | 12/2022 | Jovanovic | G06T 15/20 |

OTHER PUBLICATIONS

Why You Probably Need fillers in Your new Kitchen. Youtube Video screenshot. 1 page (Year: 2017).*
ZipGen website, zipgen.com, accessed/printed Oct. 28, 2021.

\* cited by examiner

Products List 1300

*Figure 13*

TOOL FOR OBJECT PLACEMENT WITHIN A DEFINED ENVIRONMENT

BACKGROUND

Interior design is generally known as the art of enhancing the interior of a building to produce an aesthetically pleasing environment. While not an exhaustive list, the process of designing a room includes selecting equipment, furnishings, window coverings, and so on. Different techniques are used depending on the type of environment. For instance, a warehouse will be organized differently than a salon.

The interior design process generally includes multiple steps. These steps include a design step or phase, a purchasing phase, and a roll out phase. A significant amount of time and energy is involved during each of these steps, but perhaps the most time is spent during the design phase. For instance, a designer needs to understand the dimensions of the room he/she will be working with. The designer also needs to understand how the items in the room will mesh with one another. Although different tools are available to assist designers with the design phase, there are still many areas for improvement. Accordingly, what is needed is an improved tool for assisting designers with placing objects or items in a defined environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments described herein relate to systems, devices, and methods for providing a unique user interface and backend service designed to improve object or item placement within a defined environment.

For example, some embodiments provide a user interface (UI) designed to facilitate organization of items within a defined enclosure, where the placement of the items within the defined enclosure is governed, at least in part, by a set of predefined rules. The embodiments receive a set of measurements detailing dimensions of an area and populate an item selection menu within the UI with a set of items listed in a database. Here, the database provides a corresponding set of dimensions for each item in the set of items. The embodiments also display, within the UI, a design layout area. The design layout area is configured to virtually represent the area. That is, dimensions of the design layout area are proportional to the dimensions of the area. In response to a particular item being selected from the item selection menu and being placed at a particular location within the design layout area, the embodiments trigger the application of a set of predefined rules. The set of predefined rules governs placement of items within the design layout area. The embodiments then determine that placement of the particular item at the particular location does not violate the set of predefined rules and permit the placement. Alternatively, the embodiments determine that the placement of the particular item at the particular location does violate the set of predefined rules. As a consequence, the embodiments display one or more alternative suggestions. The alternative suggestions include a first suggestion indicating where the particular item can alternatively be placed within the design layout area so as to not violate the set of predefined rules. The alternative suggestions further include a second suggestion indicating how the particular item can alternatively be structured so as to be placed at the particular location without violating the set of predefined rules.

Some embodiments provide a UI designed to facilitate organization of items within a defined enclosure, where placement or removal of the items within the defined enclosure triggers automatic update of a pricing UI element that is displayed in the UI. For example, the embodiments receive a set of measurements detailing dimensions of an area and populate an item selection menu within the UI with a set of items listed in a database. The database provides a corresponding set of dimensions for each item in the set of items. The embodiments display, within the UI, a design layout area, which is configured to virtually represent the area such that dimensions of the design layout area are proportional to the dimensions of the area. In response to a particular item being selected from the item selection menu and being placed at a particular location within the design layout area, a display of a pricing indicator is updated to reflect a potential purchase of the particular item. Here, a price of the particular item is also included in the database.

Some embodiments receive a set of measurements detailing dimensions of an area and populate an item selection menu within a UI with a set of items listed in a database, where the database provides a corresponding set of dimensions for each item in the set of items. The embodiments display, within the UI, a design layout area that is configured to virtually represent the area such that dimensions of the design layout area are proportional to the dimensions of the area. In response to a particular item being selected from the item selection menu and being placed at a particular location within the design layout area, the application of a set of predefined rules is triggered, where the rules govern placement of items within the design layout area. The embodiments identify other items that are located proximately to the particular location. While permitting the particular item to be placed at the particular location, the embodiments modify placement locations of the other items in response to the particular item being placed at the particular location. The process of modifying the placement locations of the other items is based on the set of predefined rules.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 13 illustrates how a products or items list can be provided.

DETAILED DESCRIPTION

Figure 1:
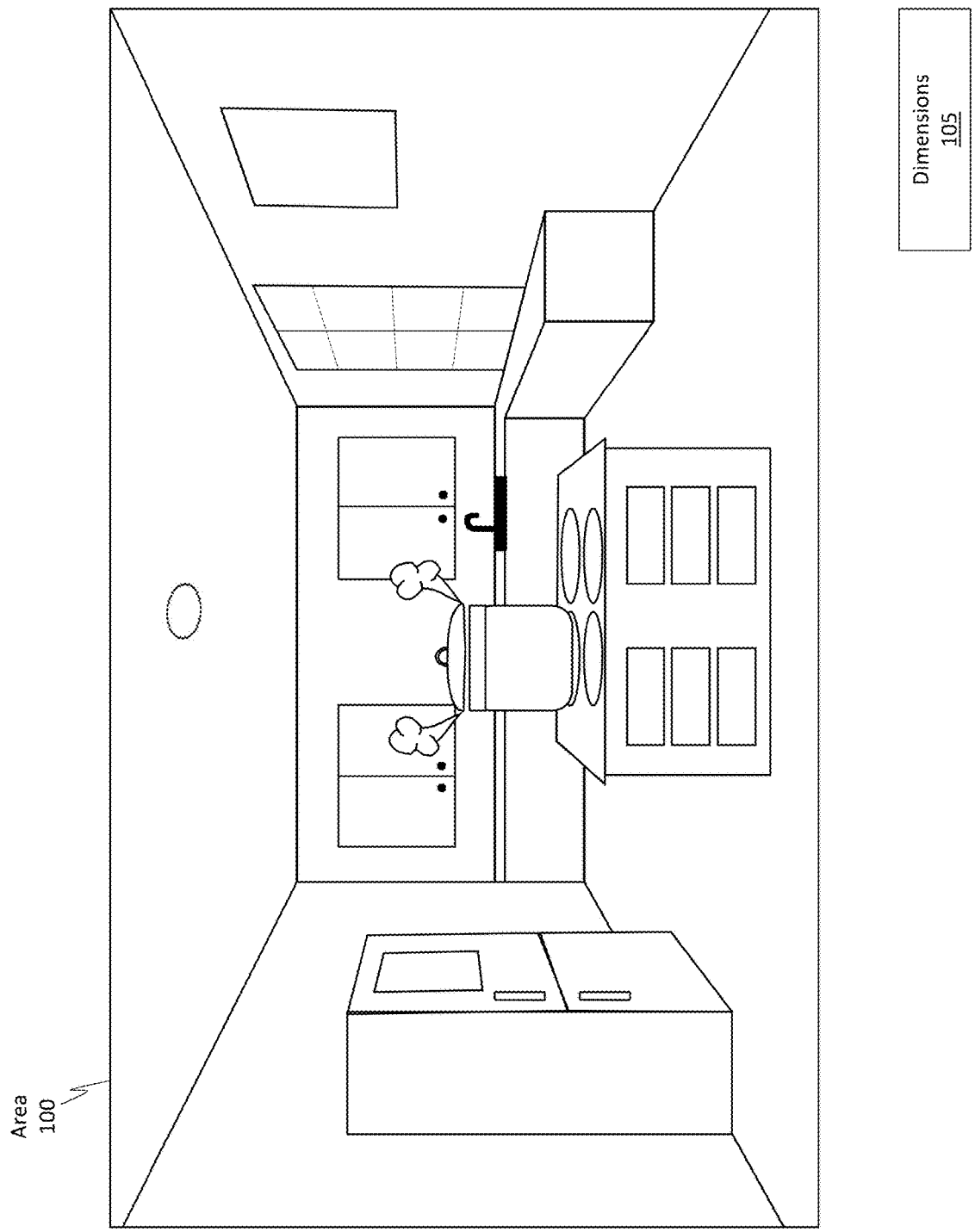
FIG. 1 illustrates an example area or environment that is to be designed or redesigned using the disclosed user interface.

Embodiments described herein relate to systems, devices, and methods for providing a unique user interface and backend service designed to improve object or item placement within a defined environment.

Some embodiments provide a UI designed to facilitate organization of items within a defined enclosure, where the placement of the items is governed by a set of rules. The embodiments receive measurements detailing dimensions of an area and populate an item selection menu within the UI with a set of items listed in a database. The embodiments also display a design layout area that represents the area or enclosure. In response to an item being selected from the item selection menu and being placed at a location within the design layout area, the embodiments trigger the application of a set of predefined rules. The embodiments determine that the placement of the item does not violate the set of predefined rules or, alternatively, does violate the set of predefined rules. If the rules are violated, then alternative suggestions are provided. If the rules are not violated, then the item is placed at the location.

Some embodiments allow for the placement or removal of items within the UI and also trigger the automatic update of a pricing UI element. Room measurements are received, and the item selection menu is populated. The design layout area is also displayed. In response to an item being selected from the item selection menu and being placed at a particular location within the design layout area, a display of a pricing indicator is updated to reflect a potential purchase of the particular item. The price of the item is included in the database.

Some embodiments receive measurements and populate the item selection menu. The embodiments also display the design layout area. In response to an item being selected from the item selection menu and being placed at a location within the design layout area, the rules are triggered. The embodiments identify other items that are located proximately to the location. The embodiments permit the item to be placed at the particular location but modify the placement locations of the other items. The process of modifying the placement locations of the other items is based on the rules. As used herein, the terms "item" and "object" are interchangeable with one another and generally refer to any type of thing used to decorate or furnish an area.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide numerous benefits and advantages to the technical field. For instance, the embodiments are focused on an improved user interface designed to help the process of interior design. By interacting with the user interface, users will be able to design rooms in a faster and more efficient manner. Furthermore, the disclosed user interface enhances the user's interaction with the computer system, thereby improving the user's experience. The disclosed user interface is designed to have a particular visual layout. This layout enables information to be displayed and presented to the user in an intuitive and understandable manner. By providing this unique design layout, the user is benefitted in that he/she will be able to quickly design rooms.

The disclosed embodiments also provide intelligently created suggestions or alternative proposals (e.g., layout proposals where items, such as perhaps furniture, are arranged in a room) based on the detectable conditions that are present. As an example, the embodiments can detect that a user may be desirous to add a particular item at a particular location; however, that item might not be shaped, sized, or configured in a manner so as to be placed at that position. The embodiments (optionally through machine learning) can intelligently propose one or more suggestions that are designed to satisfy the user's desire. As an example, the system might suggest an alternative item that is similar to the item the user selected but that can be configured in the manner requested by the user. As another example, the system can intelligently propose a new location for the item.

As yet another example, the embodiments can recognize or detect a design genre (e.g., farmhouse look, or modern look, or futuristic look). The embodiments can then intelligently determine how items are conventionally arranged so as to follow that genre. The embodiments can also optionally filter items based on their genre types so that only relevant items are displayed to the user for selection. In this regard, the embodiments can intelligently determine a collection of possible designs or arrangements that would fit within the confines of the identified room or area based on known attributes of the room. In some cases, the user can select a number of items and feed those items into a design engine along with the measurements of the room. The user can then indicate that he/she would like the design engine to generate a number of possible arrangements for the room using the selected items.

Another benefit relates to issue avoidance. As an example, the embodiments are able to detect when a possible issue or alarming condition might occur as a result of a user placing an item at a particular location. One example might be if a user places a table within the area where a door opens. The embodiments can detect such a condition and issue an alert to inform the user of the issue. As will be discussed in more detail later, any number of different intelligent suggestions, alarms, or alerts can be provided. Accordingly, these and numerous other benefits will be discussed in more detail throughout the remaining portions of this disclosure.

Area Design

Attention will now be directed to FIG. 1, which illustrates an example area 100 that is to be designed or redesigned. Although area 100 is shown as being a kitchen, any type of area can be referenced herein. Indeed, such areas can include any type of office room, warehouse room, bedroom, kitchen, family room, living room, entertainment area, any type of business area, and so on, without limit.

In accordance with the disclosed principles, the dimensions 105 of the area 100 are obtained. The dimensions 105 can include the length, width, and height of the area 100. The dimensions 105 can also detail pop-out sections of the area 100 or constrained areas. The dimensions 105 can also include information indicating the locations of windows, electrical plugs, existing frameworks (e.g., islands, counters, etc.), doors, lighting fixtures, and so forth without limit. Indeed, any dimensional characteristic of the area 100 can be determined and included in the dimensions 105.

These dimensions 105 can be obtained using various techniques. By way of example, manual measurement of the area 100 can be performed to determine the dimensions 105, and then those measurements can be inputted into the disclosed systems. The manual measurement can include using a laser range finder, a measuring tape, or any other type of instrument to determine the dimensions 105.

Automatic measurement of the area 100 can also be performed. For instance, using a mixed-reality (e.g., virtual reality or augmented reality) headset, a user can scan the area 100 and use the headset to generate a surface reconstruction mesh of the area 100. The surface reconstruction mesh is a 3D model of the area 100. That 3D model is generated using depth cameras and other instruments on the headset to determine the dimensions 105, contours, and other features of the area 100. Accordingly, different techniques can be used to determine the dimensions 105 of the area 100.

Example Architecture

Figure 2:
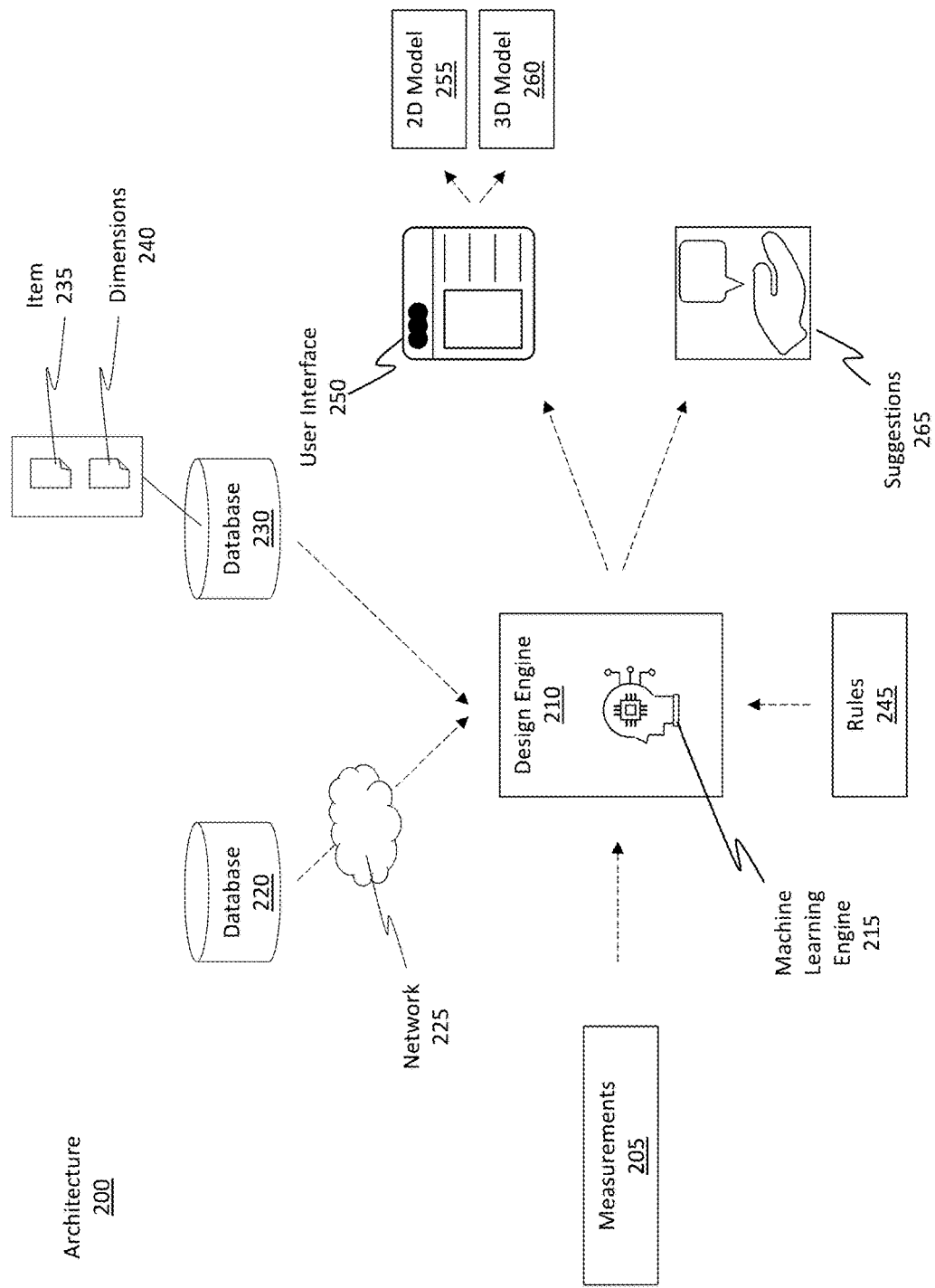
FIG. 2 illustrates an example architecture that provides a frontend user interface and a backend computing system to facilitate the placement of items within a defined enclosure.

FIG. 2 illustrates an example architecture 200 that can be used by the disclosed embodiments to perform the disclosed operations. Architecture 200 is shown as including an input of measurements 205. The measurements 205 are representative of the dimensions 105 from FIG. 1.

The measurements 205 are fed as input into a design engine 210. In some cases, the design engine 210 is or includes a machine learning engine 215. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The design engine 210 (and the machine learning engine 215) is designed to provide an improved and intelligent user interface (to be introduced shortly) that can facilitate the design and placement of items within a room. The design engine 210 is able to communicate with a remote database 220 that is connected to the design engine 210 over a network 225. Additionally, or alternatively, the design engine 210 can communicate with a local database 230. The databases 220 and 230 can include a plethora of information about items that can be disposed within a room.

For example, the database 230 is shown as including a record detailing an item 235 and dimensions 240 of that item. The item 235 can be any type of item including, but not limited to, any type of furnishing, appliance, frame, accessory, cabinet, shelf, chair, sofa, couch, desk, lighting system, speaker, and so on. The databases 220 and 230 can represent a collection of inventories from different stores and branding of items. The databases 220 and 230 can be populated by an Internet crawler that crawls through websites to detect the inventories of stores and other entities.

The characteristics and dimensions of each item can also be recorded in the databases 220 and 230. Additionally, as will be discussed in more detail later, pricing information as well as alternative configurations of the items can be included in the databases as well. For instance, one item might be available in multiple different sizes or configurations. Those sizes and configurations can be included in the databases.

The design engine 210 is also able to access a set of rules 245. Beneficially, users of the architecture 200 can define their own set of rules, preferences, or conditions. Additionally, or alternatively, the design engine 210 can generate a set of default rules.

That is, the rules can include users' needs, preferences, requirements, and so on. For instance, the user might prefer that a certain amount of space always exists between an item of a first type and an item of a second type. The preferences can also include functional preferences, such as the ability to allow a certain number of people to work or be located comfortably within a certain area. In this sense, accessing or obtaining the rules 245 can also include obtaining any type of user preference, which, as used herein, can be referred to as a type of rule. As will be described in more detail later, the embodiments are able to generate any number of possible rules.

In some cases, a rule marked as a "preference" can be weighted differently than a rule marked as a "requirement." For instance, a user might require a kitchen to include a refrigerator but might prefer that the island is within arm's reach of the refrigerator. The requirement can be given a weight such that it must be satisfied while the preference can be given a lesser weight. It might even be the case that the preference is not achieved or satisfied, but the requirement will be satisfied. Accordingly, some of the rules 245 can be weighted differently.

The rules 245 govern at least the placement of items within a user interface 250. The rules 245 can also govern relationships between items as well as potentially which items can coexist with whichever other items.

The user interface 250 can represent an area (e.g., area 100 of FIG. 1) and how items are placed in that area. The user interface 250 can visually represent the area and the items using a 2D model 255 and/or a 3D model 260. To clarify, a particular design can be displayed in a 2D format. Additionally, or alternatively, the design can be displayed in a 3D format.

As one example of a rule, the rules 245 might govern that if an electrical plug is located near a water faucet, then that outlet is required to be a GFCI outlet. As another example, the rules 245 might govern that the placement of a kitchen cabinet cannot exceed a certain height above the ground. As yet another example, the rules 245 might govern which items are permitted to be placed near which other objects/items. For instance, a bed should probably not be placed next to an oven. Indeed, any set of constraints, conditions, or preferences can be included in the rules 245, and those rules 245 can be user defined, automatically defined, or a combination of both, without limit.

The design engine 210 is able to identify the operations of the user and can discern general practices or principles the user is following. For instance, if the user is designing a room using farmhouse décor, then the design engine 210 can detect that style. Of course, other operations and discernments can be made as well. Based on a buildup or collection of knowledge and information, the design engine 210 can generate one or more suggestions 265 on how the room is to be laid out and items in that room placed. These suggestions 265 can be generated by the machine learning engine 215. Accordingly, the architecture 200 can be used to facilitate the disclosed operations.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
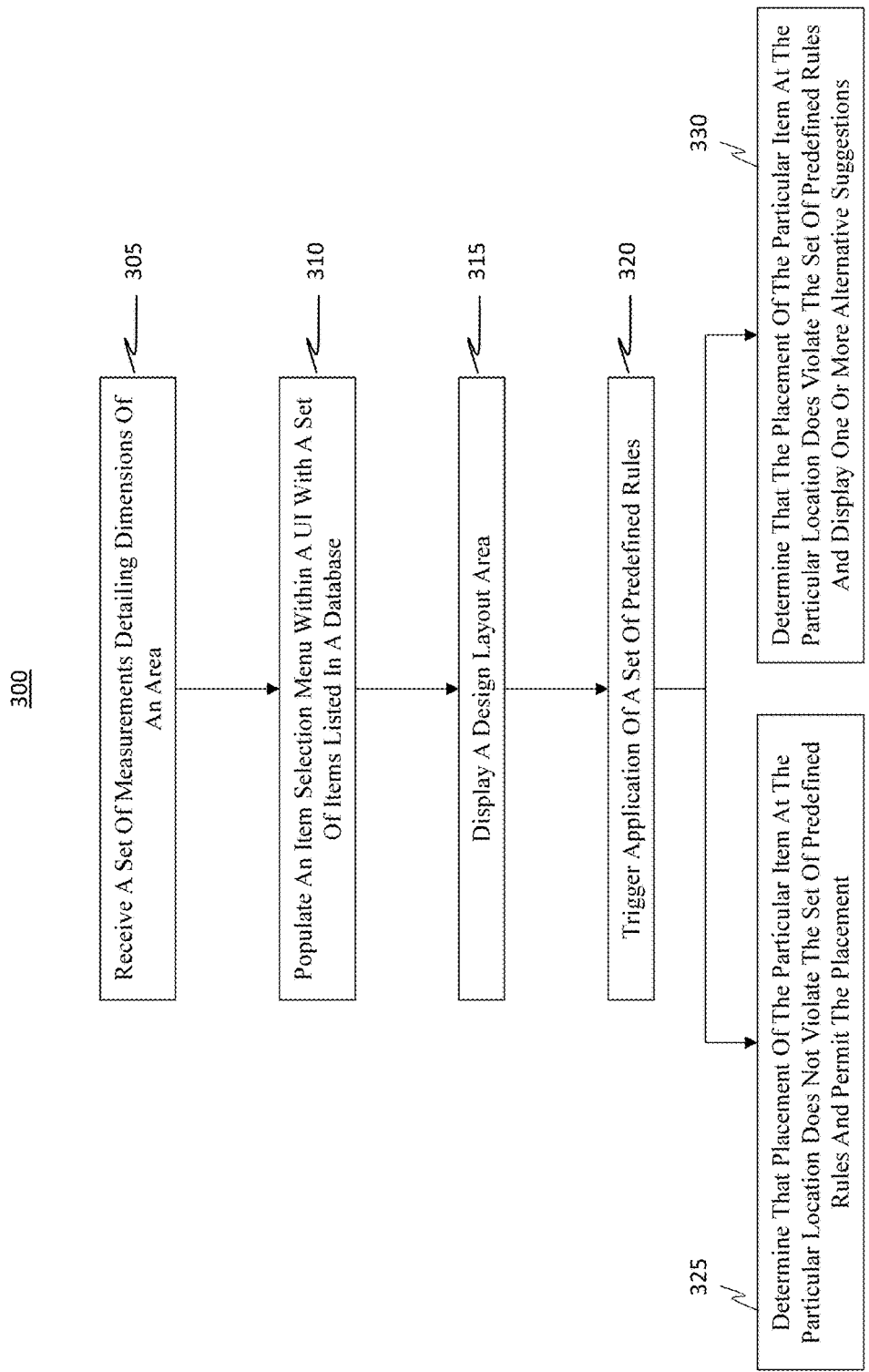
FIG. 3 illustrates a flowchart of an example method for placing items within a design layout area of a user interface and for relying on a set of rules to govern the placement of those items.

Attention will now be directed to FIG. 3, which illustrates a flowchart of an example method 300 for providing a user interface (UI) designed to facilitate organization of items within a defined enclosure or area, where the placement of the items within the defined enclosure is governed, at least in part, by a set of predefined rules. The method 300 can be implemented within the architecture 200 of FIG. 2. For instance, the UI can be the user interface 250 of FIG. 2, the set of predefined rules can be the rules 245, and the defined enclosure can be the area 100 of FIG. 1.

Initially, method 300 includes an act (act 305) of receiving a set of measurements detailing dimensions of an area. The measurements 205 from FIG. 2 are representative of the measurements, and the dimensions 105 from FIG. 1 are representative of the dimensions. As mentioned earlier, different techniques are available to determine the measurements.

Act 310 involves populating an item selection menu within a UI with a set of items listed in a database. Notably, the database provides a corresponding set of dimensions for each item in the set of items. The databases 220 and 230 are representative of the database mentioned in act 310. By way of example, the set of items can optionally include a countertop, a shelf, an island, and a cooking range. The set of items can optionally include any type of household furnishing, office furnishing, or warehouse furnishing. Any type of appliance, fixture, or any other object can also be included among the set of items.

Figure 4:
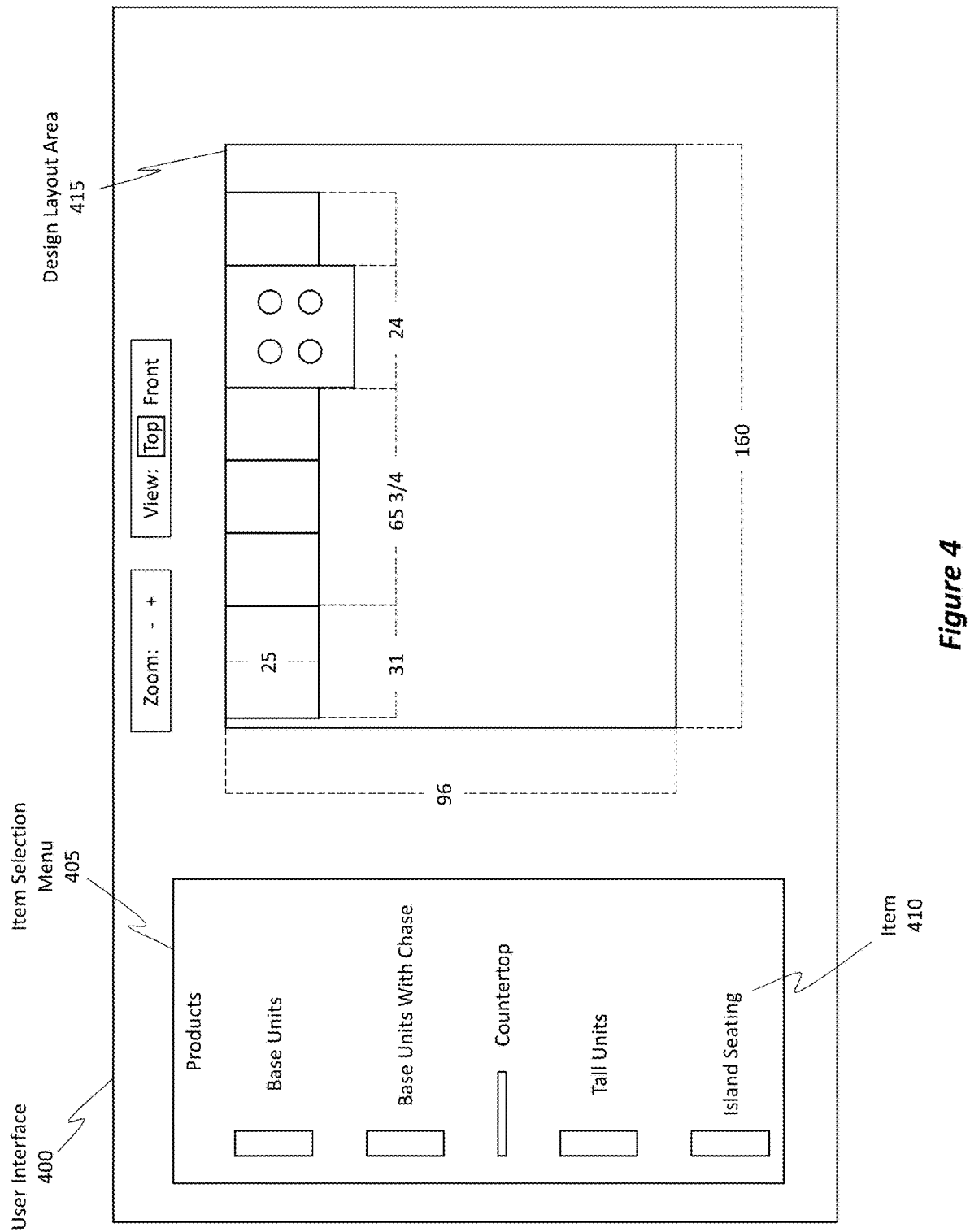
FIG. 4 illustrates an example of a user interface that includes an item selection menu and a design layout area.

FIG. 4 shows an example of a user interface, which is representative of the user interfaces mentioned herein. Specifically, FIG. 4 shows an example user interface 400 that includes an item selection menu 405 comprising a set of items, such as item 410. As described above, the item selection menu 405 can be populated with the items listed in the database. Of course, a hierarchical scheme or other organizational format can be used to display the items in the item selection menu 405. Furthermore, any type of sorting or filtering technique is also available, including filtering based on genre or décor type. Each item in the item selection menu 405 is selectable for use within the user interface 400.

Returning to FIG. 3, method 300 also includes an act (act 315) of displaying, within the UI, a design layout area. The design layout area is configured to virtually represent the area. That is, dimensions of the design layout area are proportional to the dimensions of the area. In some cases, the UI is configured to display the dimensions of the area. Furthermore, the dimensions for a particular item can also be displayed by the UI, and those dimensions can be displayed at locations proximate to where the item is located in the UI. FIG. 4 is again representative.

FIG. 4 shows a design layout area 415. The size or dimensions of the design layout area 415 are determined based on the measurements 205 from FIG. 2. That is, the layout and configuration of the design layout area 415 are designed to match or be proportional to the dimensions of the area 100 of FIG. 1. In some implementations, the dimensions of the area are visually displayed in the user interface 400. For instance, the design layout area 415 is shown as having the following dimensions: 96×160. Those dimensions match the dimensions of the area 100 of FIG. 1. Other dimensions can also be visually displayed, such as the dimensions of the items currently placed or located in the design layout area 415. For instance, the dimension of the cooking range is shown as being 24 wide. Of course, these are example illustrations only and the broader principles apply.

Figure 5:
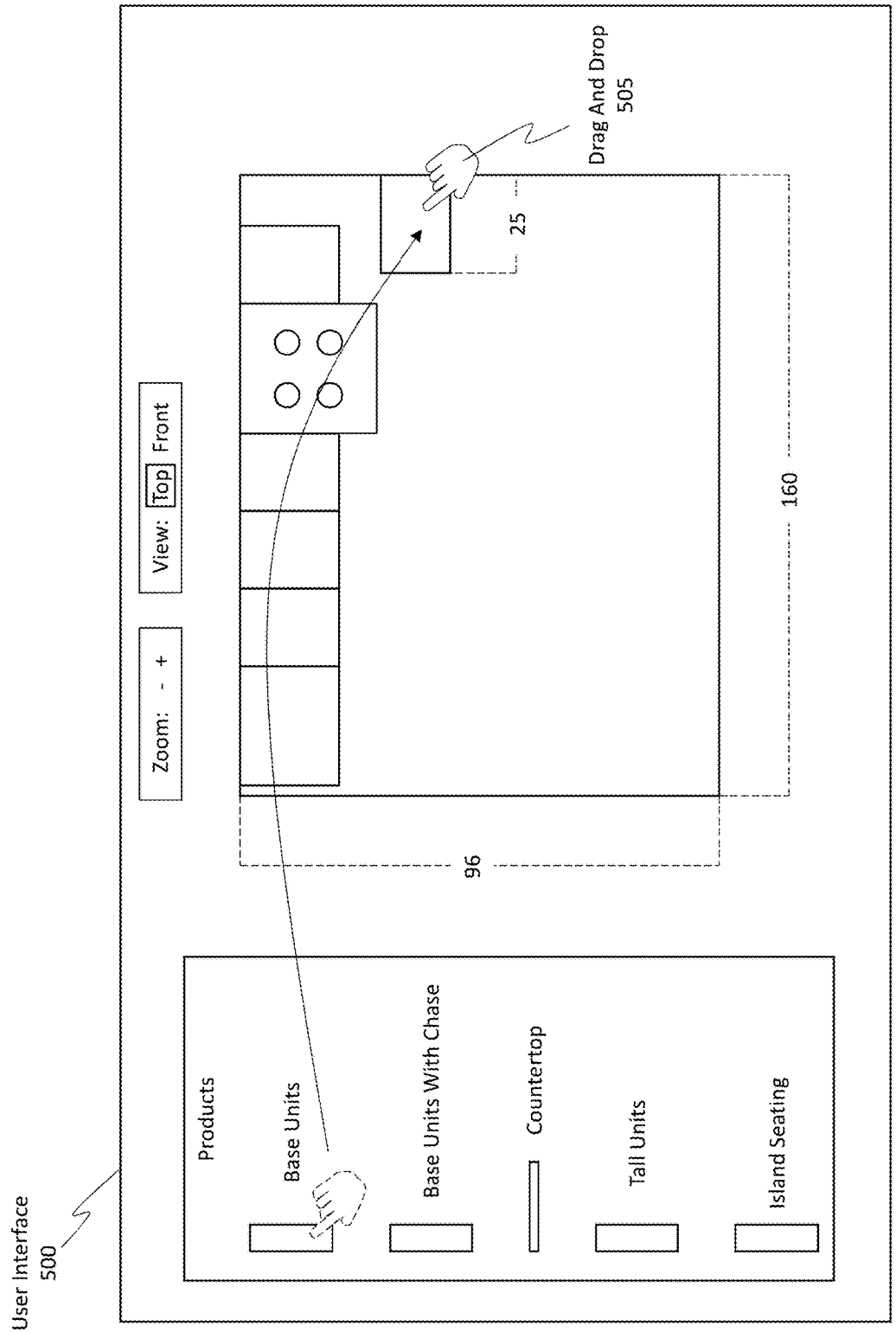
FIG. 5 illustrates how items can be selected from the item selection menu and dropped onto the design layout area.

Act 320 in FIG. 3 is then performed. That is, in response to a particular item being selected from the item selection menu and being placed at a particular location within the design layout area, act 320 involves triggering application of a set of predefined rules. The set of predefined rules governs placement of items within the design layout area. In some cases, the predefine rules can be generated in a dynamic manner, such as by a machine learning algorithm that is trained. For instance, the rules can be dynamically generated rules that are based on a combination of trained pattern recognition and other elements. The rules can be tailored to make aesthetic and/or functional recommendation or even decisions to improve a design. FIG. 5 is illustrative.

FIG. 5 shows an example user interface 500 that is representative of the user interface 400. Here, a user has selected a "Base Unit" item (e.g., perhaps a counter and drawer set) and has dragged it from the item selection menu into the design layout area, as shown by the drag and drop 505 operation. Although a drag and drop 505 operation is shown, other techniques can be used to add an item to the design layout area (e.g., checking a box, selecting the item, etc.). Accordingly, in this scenario, a user is able to add items to the design layout area and can place those items at different locations. Using these techniques, the user can discern how items will relate to one another within the design layout area, and the user can map out and design the interior features of the area.

The set of rules govern how and where items can be placed as well as relationships between items and infrastructure. For instance, the item that was dropped into the user interface 500 is a type that cannot overlap another item. That is, if the user were to try to place the item as overlapping another item, the rules would prohibit that type of operation. The rules can also govern how closely items are placed to one another, whether items should be grouped together, when a so-called "scribe" (to be discussed in more detail later) is to be added, and so on, without limit.

In some cases, the UI displays the particular item and room in a two-dimensional manner. In some cases, the UI displays the particular item and room in a three-dimensional manner.

Returning to FIG. 3, the method 300 then branches to a number of alternative options. Specifically, act 325 includes determining that placement of the particular item at the particular location does not violate the set of predefined rules. As a consequence, the embodiments permit the placement of that item at that location. FIG. 5 was illustrative of this act.

Alternatively, act 330 involves determining that the placement of the particular item at the particular location does violate the set of predefined rules. As a consequence, the embodiments display one or more alternative suggestions. The number of suggestions can be limitless, while the number of suggestions that are actually displayed are often limited to a threshold number (e.g., 1 or 2 or 3, though perhaps more than 3 suggestions are displayed). The alternative suggestions include a first suggestion indicating where the particular item can alternatively be placed within the design layout area so as to not violate the set of predefined rules. The alternative suggestions can also optionally include a second suggestion indicating how the particular item can alternatively be structured so as to be placed at the particular location without violating the set of predefined rules. The first suggestion can be displayed, the second suggestion can be displayed, or both the first and second suggestion can be displayed.

Figure 6A:
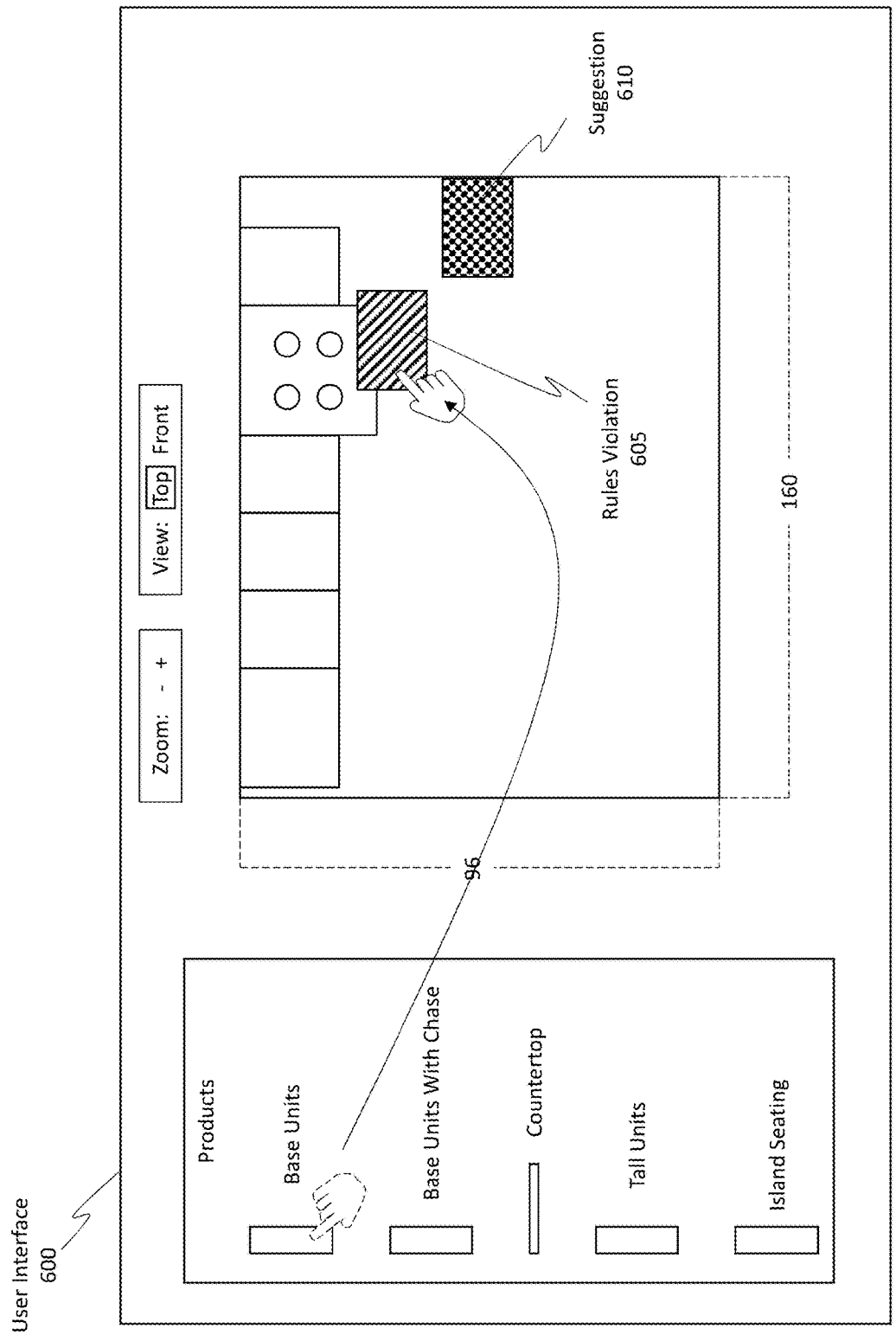
FIGS. 6A, 6B, and 6C illustrate various example scenarios where rules violations are occurring and how alternative suggestions can be provided.
Figure 6B:
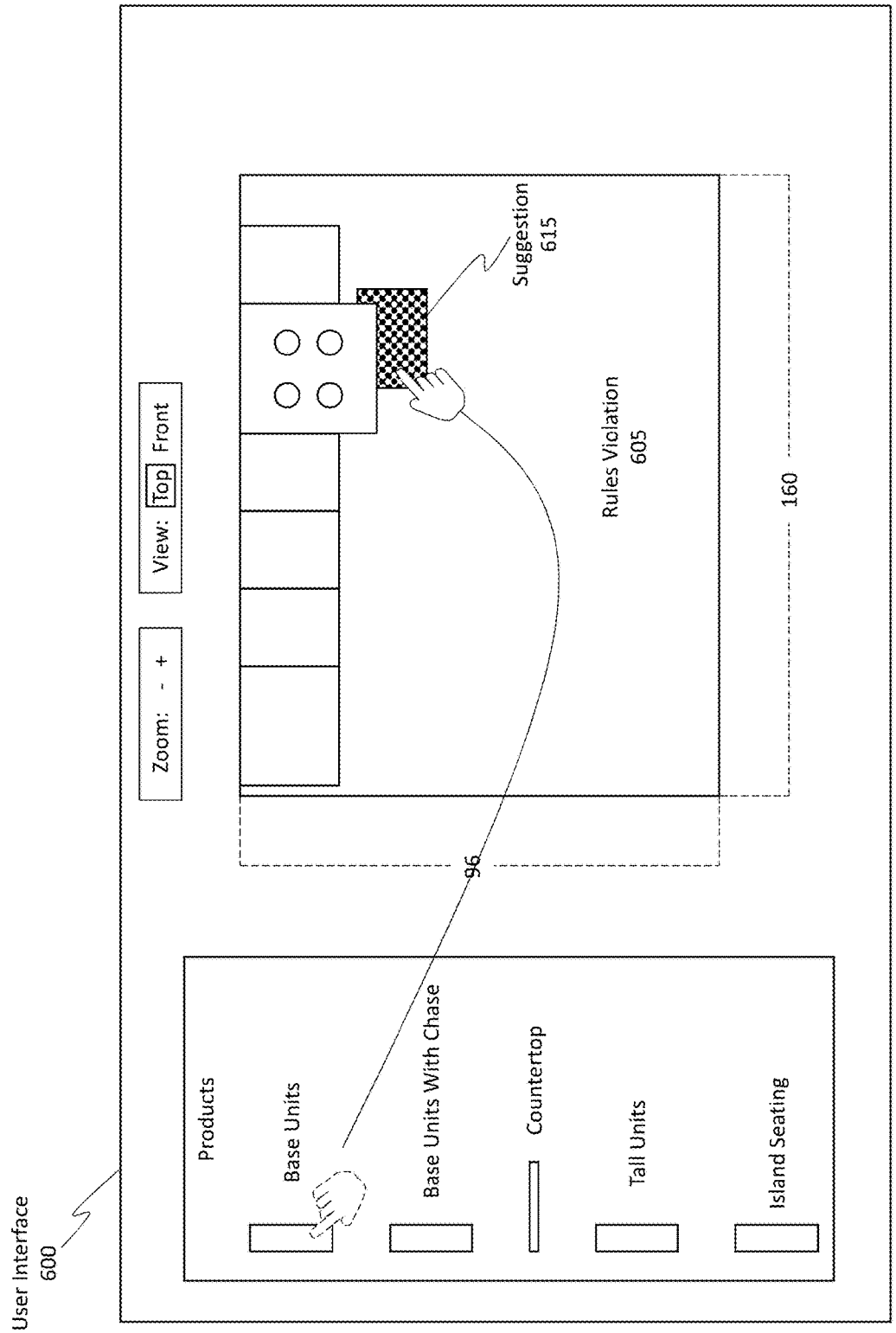
Figure 6C:
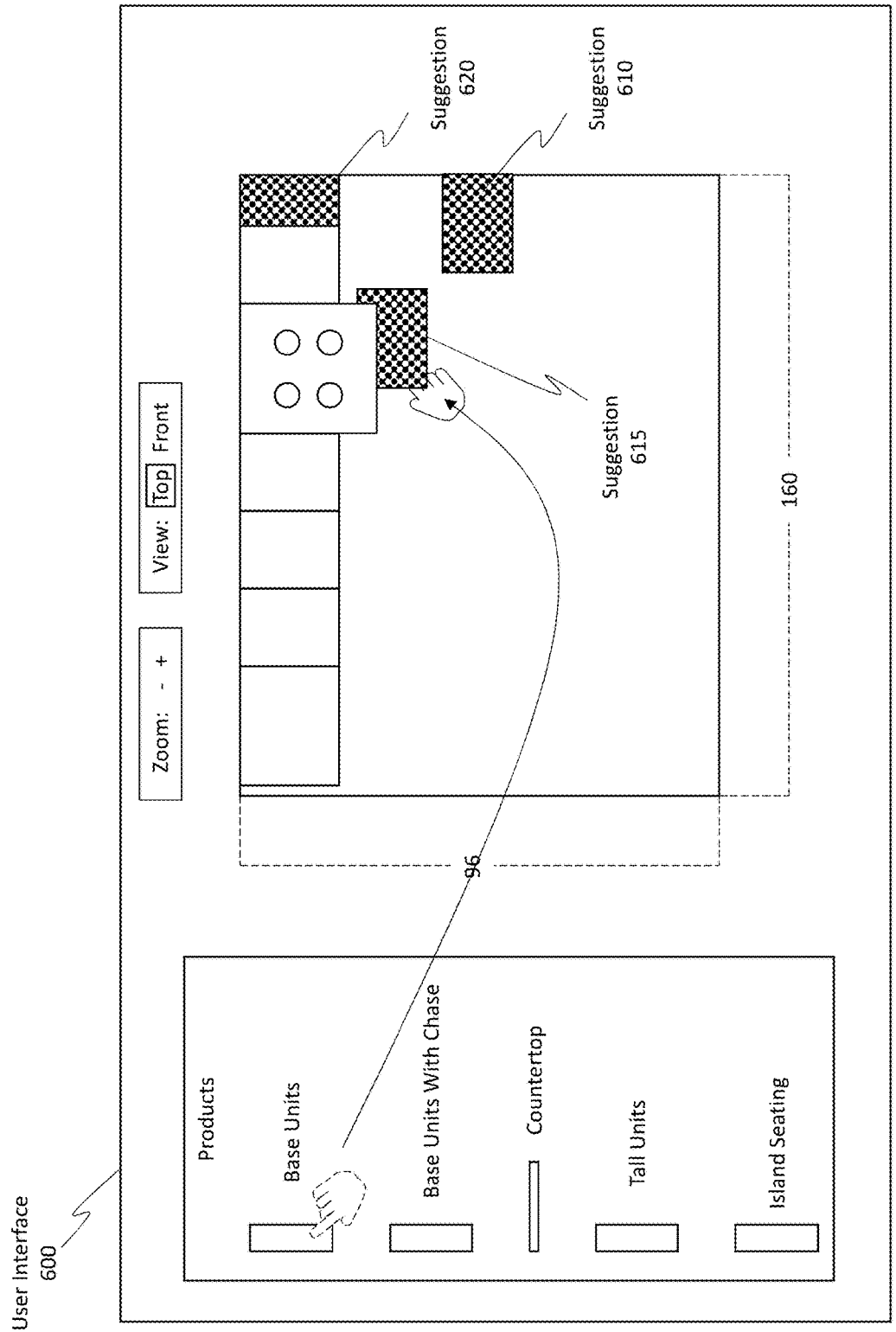

In some cases, a machine learning engine can be used to generate the one or more suggestions. FIGS. 6A, 6B, and 6C provide some useful examples.

For example, FIG. 6A shows a scenario where a user is attempting to place an item at a location that overlaps that location of another item (e.g., the cooking range) within the user interface 600, which is representative of the UIs discussed thus far. The rules have determined that such a placement is prohibited, as shown by the rules violation 605. In accordance with the disclosed principles, the embodiments are able to intelligently generate one or more alternative proposals or suggestions as to where the item can be placed. That is, it might not be the case that a simple substitute location is proposed; rather, the embodiments are able to analyze the items and the area to determine an optimal or intelligent location where the item can be placed.

As an example, suppose the user it attempting to add additional countertop space to the area. The embodiments are able to analyze the area and the existing items in that area and propose an optimal placement location for that new countertop. In the scenario shown in FIG. 6A, the suggestion 610 reflects the optimal placement location for this counter (e.g., the counter is close enough to the range so as to be useful for placing hot items thereon). The suggestion 610 can also include changes or modifications to the item, such as perhaps a granite countertop in order to support hot items (e.g., if the user selected a wood countertop, the embodiments can alternatively suggest a more durable form, such as granite, based on its proximity to the range). Accordingly, the scenario shown in FIG. 6A is representative of the above-described "first suggestion" in which the item is alternatively placed within the design layout area in a manner so as to not violate the rules. The user can accept or reject the alternative suggestion.

FIG. 6B provides an example of the "second suggestion" mentioned previously. Specifically, a rules violation 605 has occurred and the embodiments are providing a suggestion 615. Here, the item the user selected can be configured in multiple different ways, such as differences in size and even differences in shape. The databases mentioned earlier can track and record the various options for the different items. Based on that information, the design engine determined that the selected item can optionally be modified in shape in order to be placed at the desired location. More specifically, in this example case, the embodiments are providing a suggestion indicating how the item can alternatively be "structured" (e.g., shaped, oriented, sized, etc.) so as to be placed at the indicated location without violating the rules.

FIG. 6C shows a scenario where multiple different suggestions are displayed simultaneously with one another. For instance, FIG. 6C shows the suggestion 610 and the suggestion 615 along with a third suggestion 620. These suggestions are all displayed at the same time as one another (i.e. the UI can be configured to display, simultaneously, the first, second, and third suggestions). Accordingly, a threshold number of alternative suggestions can be displayed simultaneously with one another.

Figure 7:
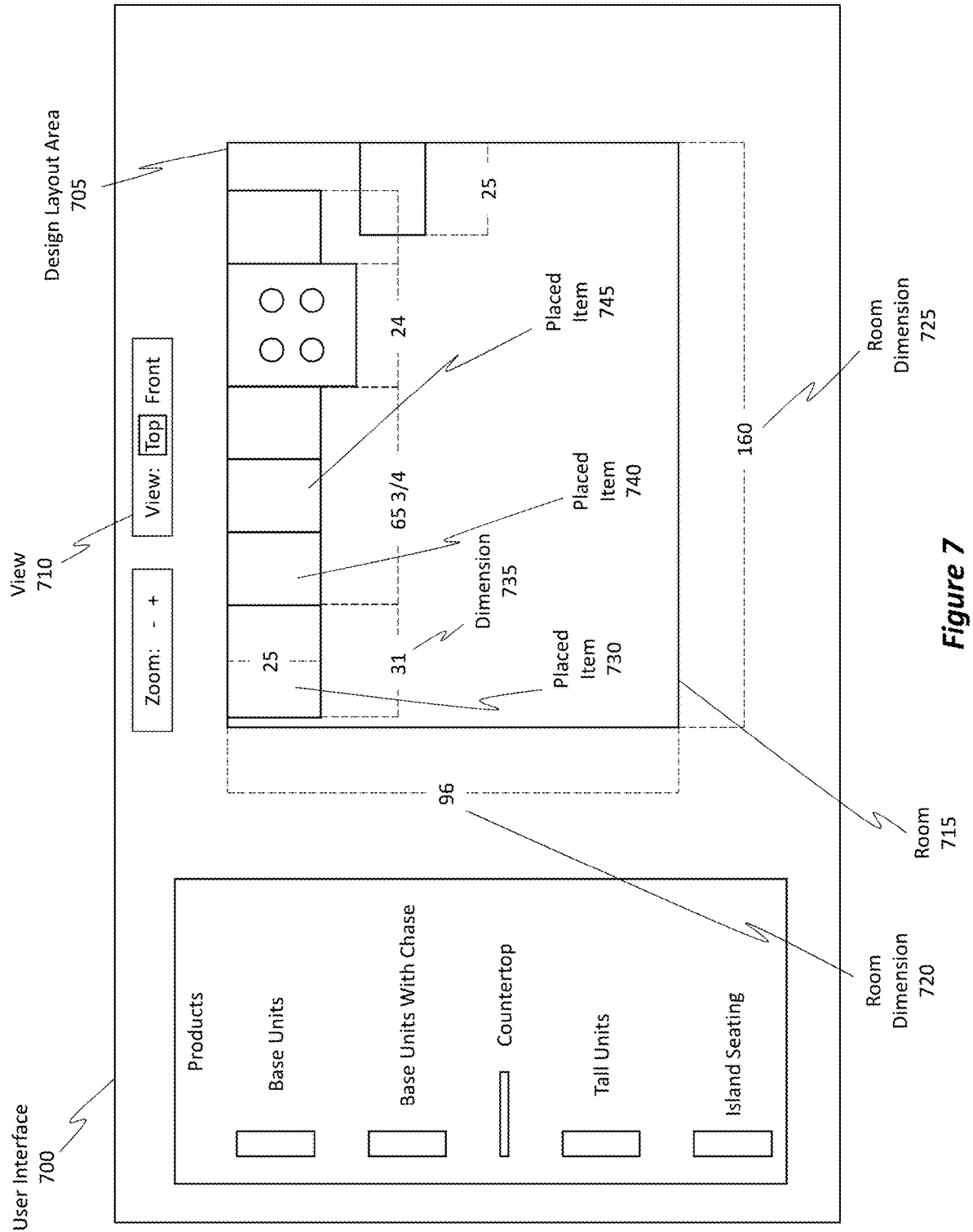
FIG. 7 illustrates how dimension metrics can be displayed in the UI.

FIG. 7 shows how the UI can display various different pieces of information for the different items. Specifically, FIG. 7 shows a user interface 700, which is representative of the UIs mentioned thus far. User interface 700 includes the design layout area 705. Also shown is a view 710 option for changing the perspective view provided by the user interface 700. Currently, the view 710 is that of a top-looking-down or an aerial view of the area. That is, the UI can be configured to provide a top aerial view of the design layout area. Another option, as will be illustrated later, is a front-looking-forward view. That is, the UI can be configured to provide a front-facing view of the design layout area.

The design layout area 705 illustrates a room 715, which is representative of the area 100 from FIG. 1. The room 715 has dimensions, as shown by room dimension 720 and room dimension 725. These dimensions can optionally be displayed in the user interface 700.

The design layout area 705 currently includes a first placed item 730 (e.g., perhaps a first counter), which has a corresponding dimension 735 (that can optionally be displayed), a second placed item 740, and a third placed item 745. These items can be selected from the item selection menu and can also be listed in the databases.

Figure 8:
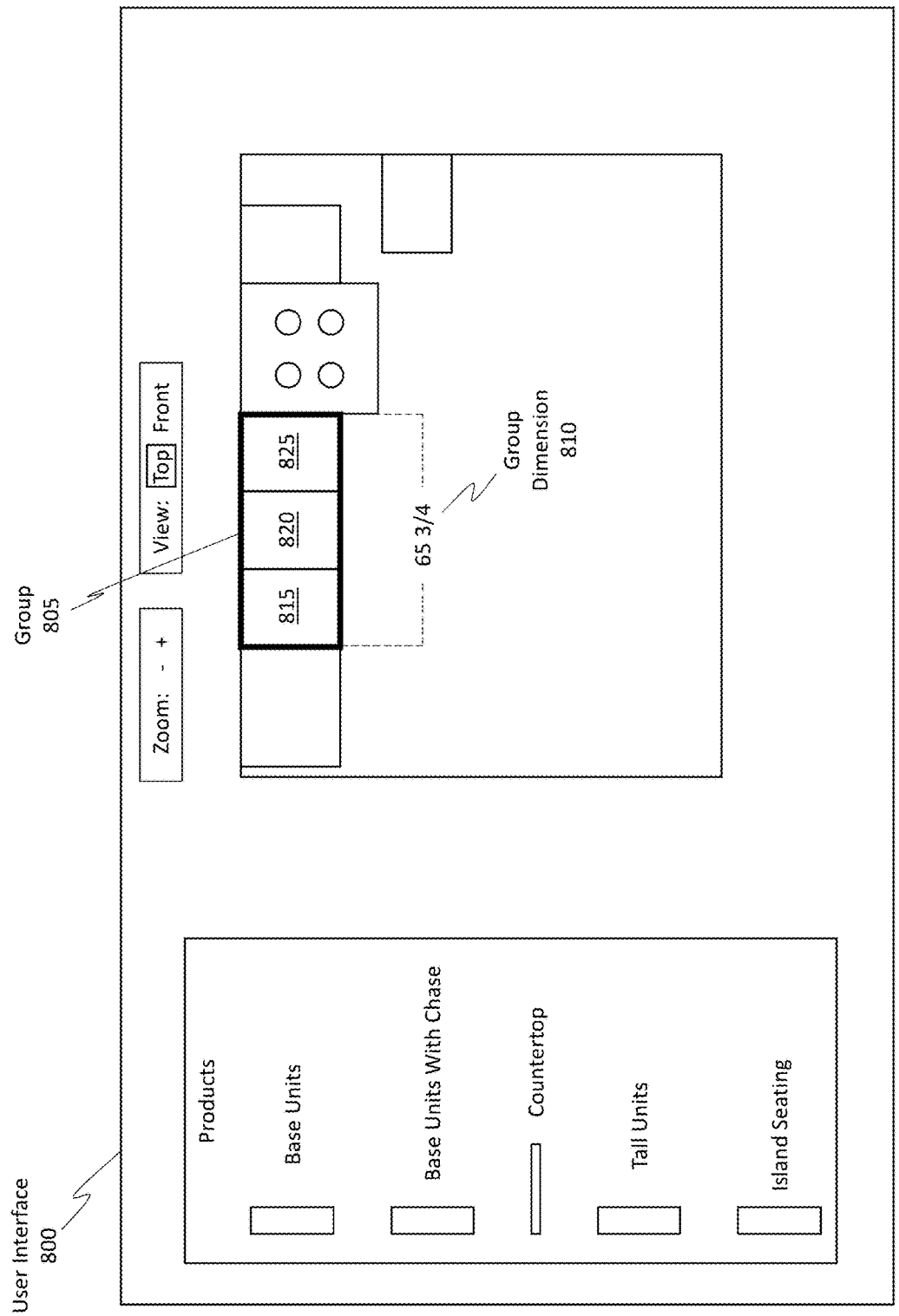
FIG. 8 illustrates how items can be grouped together in the UI.

In some implementations, items can be grouped together based on a defined grouping criteria or perhaps based on certain items sharing a common characteristic. FIG. 8 is illustrative.

FIG. 8 shows an example user interface 800, which is representative of the UIs mentioned thus far. Here, the user interface 800 is showing a group 805 of items, where the group 805 has a combined group dimension 810 and where the group 805 includes item 815, item 820, and item 825. Items 815, 820, and 825 have been grouped together as a result of those items being similar to one another. For example, those three items are all kitchen drawer and counter combinations. The disclosed embodiments allow items to be grouped together based on any defined criteria. Additionally, the user interface 800 allows users to select specific items to add or combine within a group. When presented as a group, the embodiments can display characteristics for each individual item as well as for the group as a whole, as shown by the group dimension 810. In some cases, the design engine can recommend certain items be grouped together. In some cases, those items are automatically grouped together based on the recommendation while in other cases, the embodiments delay forming the group until the user accepts the proposal.

Figure 9:
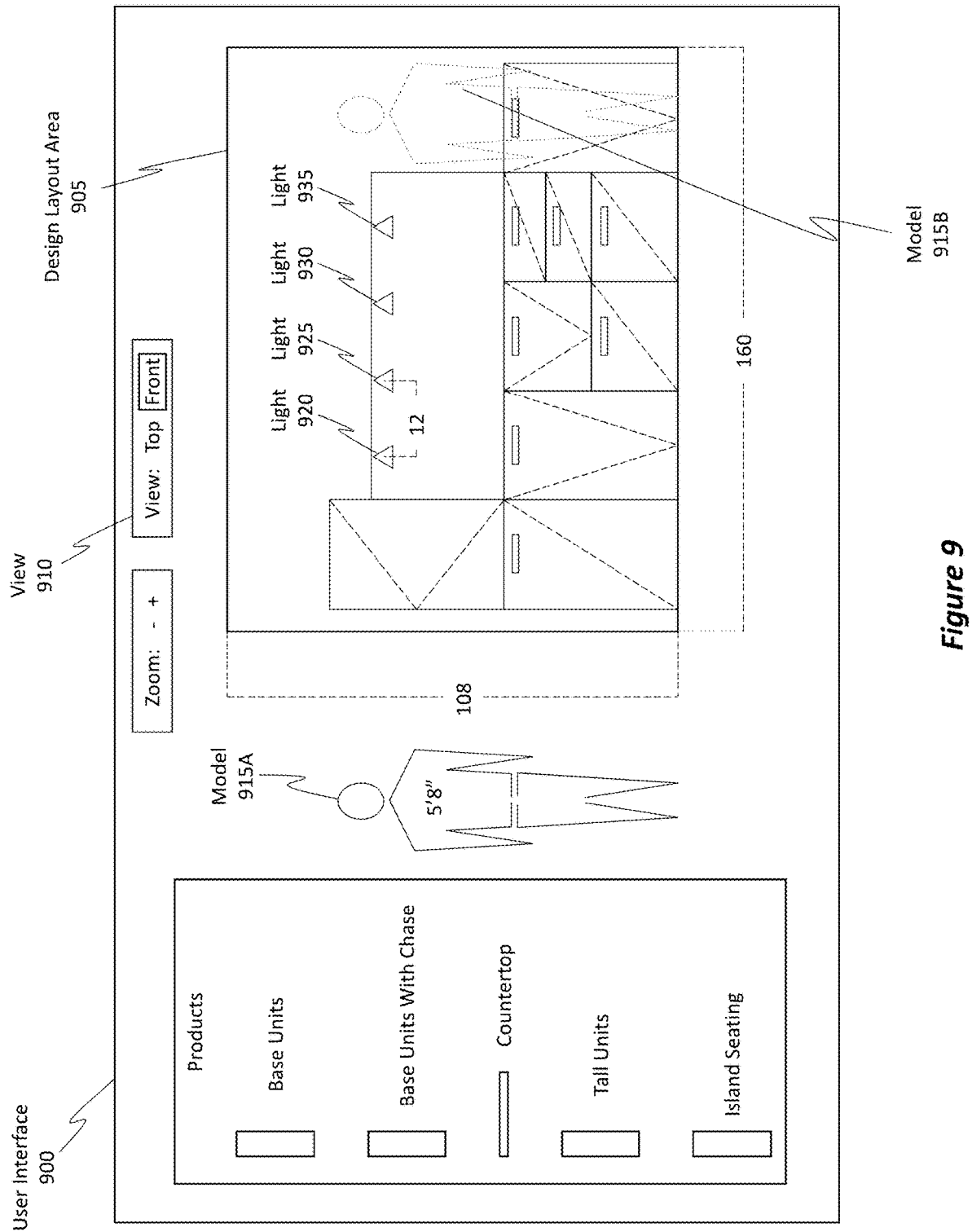
FIG. 9 illustrates how different views (e.g., a top view or a front view) can be displayed by the UI and how a model can also be displayed to illustrate relative sizes of the items.

FIG. 9 shows an example user interface 900, which includes the design layout area 905. In this example scenario, the user interface 900 is configured to have a front-facing view 910. In some implementations, when the front-facing view is selected, the user interface 900 can display a model 915A or 915B human having after characteristics. This model 915A can be displayed at a location proximate to the design layout area 905. Optionally, as shown by, model 915A, the model 915A can be displayed outside of the design layout area 905. Optionally, as shown by model 915B, the model 915B can be displayed within the design layout area 905, and the model 915B can be partially transparent. By displaying the model 915A outside of the design layout area 905, the model 915A will not impede view of the items in the design layout area 905. On the other hand, by displaying the model 915B within the design layout area 905, a user can view how the items are spaced relative to one another and relative to the model 915B.

Accordingly, in some cases, when the design layout area is configured to provide a front-facing view, a human model can be displayed proximately next to but outside of the design layout area. Alternatively, the human model can be displayed within the design layout area. Additionally, the dimensions of the human model can optionally be displayed simultaneously with the human model.

The design layout area 905 also includes a number of lighting fixtures, as shown by lights 920, 925, 930, and 935. Optionally, the user interface 900 can display spacing dimensions between these lights (e.g., the spacing dimension "12"). In some cases, a defined rule can be provided to dictate how the lights are to be spaced relative to one another. For instance, a rule can specify that the lights are to be evenly spaced or symmetrically spaced relative to one another and relative to a defined region. The rules can also specify that the lights are to be a specific distance above another item, such as perhaps the range surface. Indeed, any rule can be specified.

Dynamic Pricing

Figure 10:
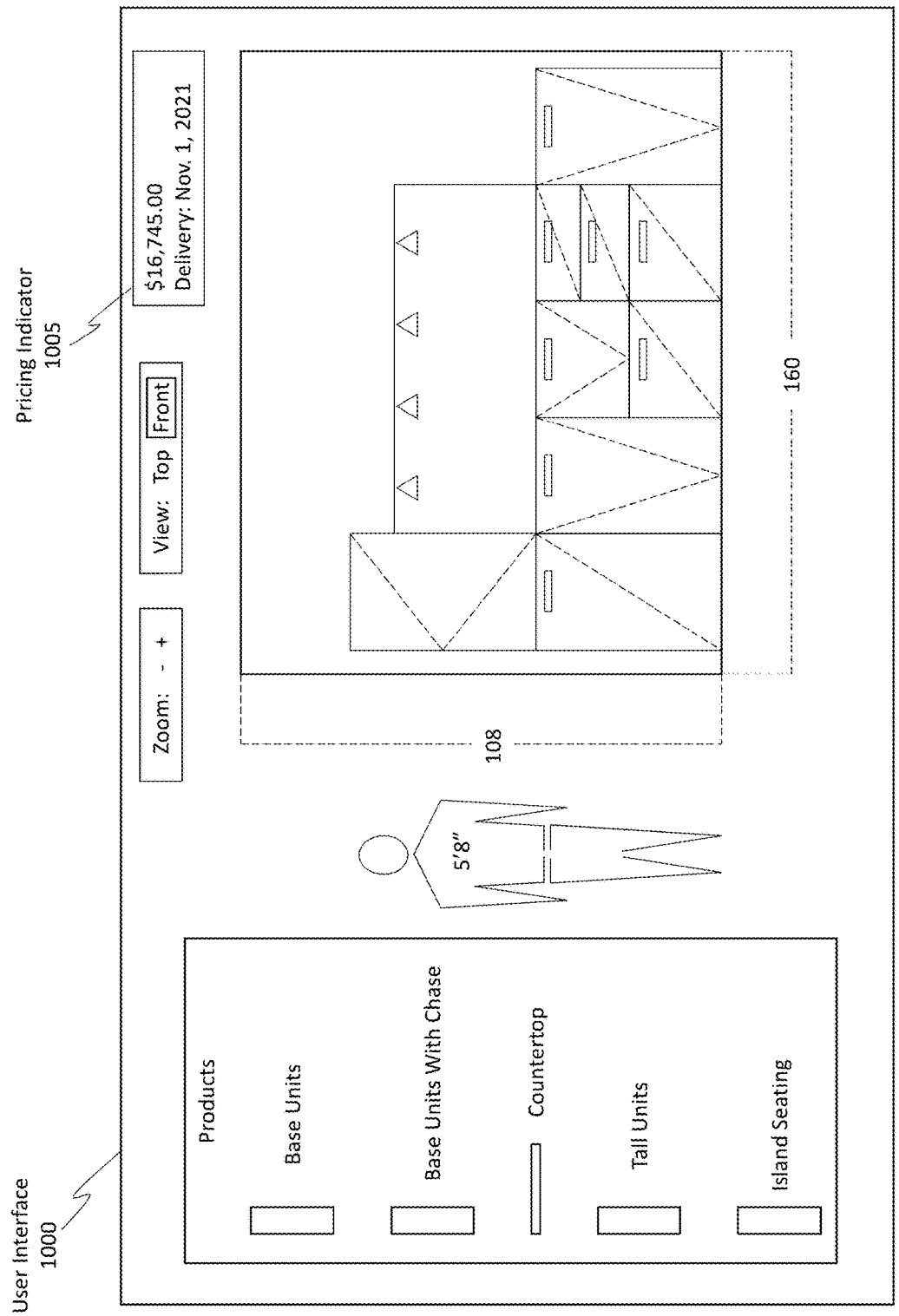
FIG. 10 illustrates how a pricing indicator can be displayed and updated.

As mentioned earlier, the databases are able to maintain pricing information for each of the various different items. As items are added or removed from the design layout area, the embodiments can track how much the modified design will cost a user. FIG. 10 is illustrative.

Figure 11:
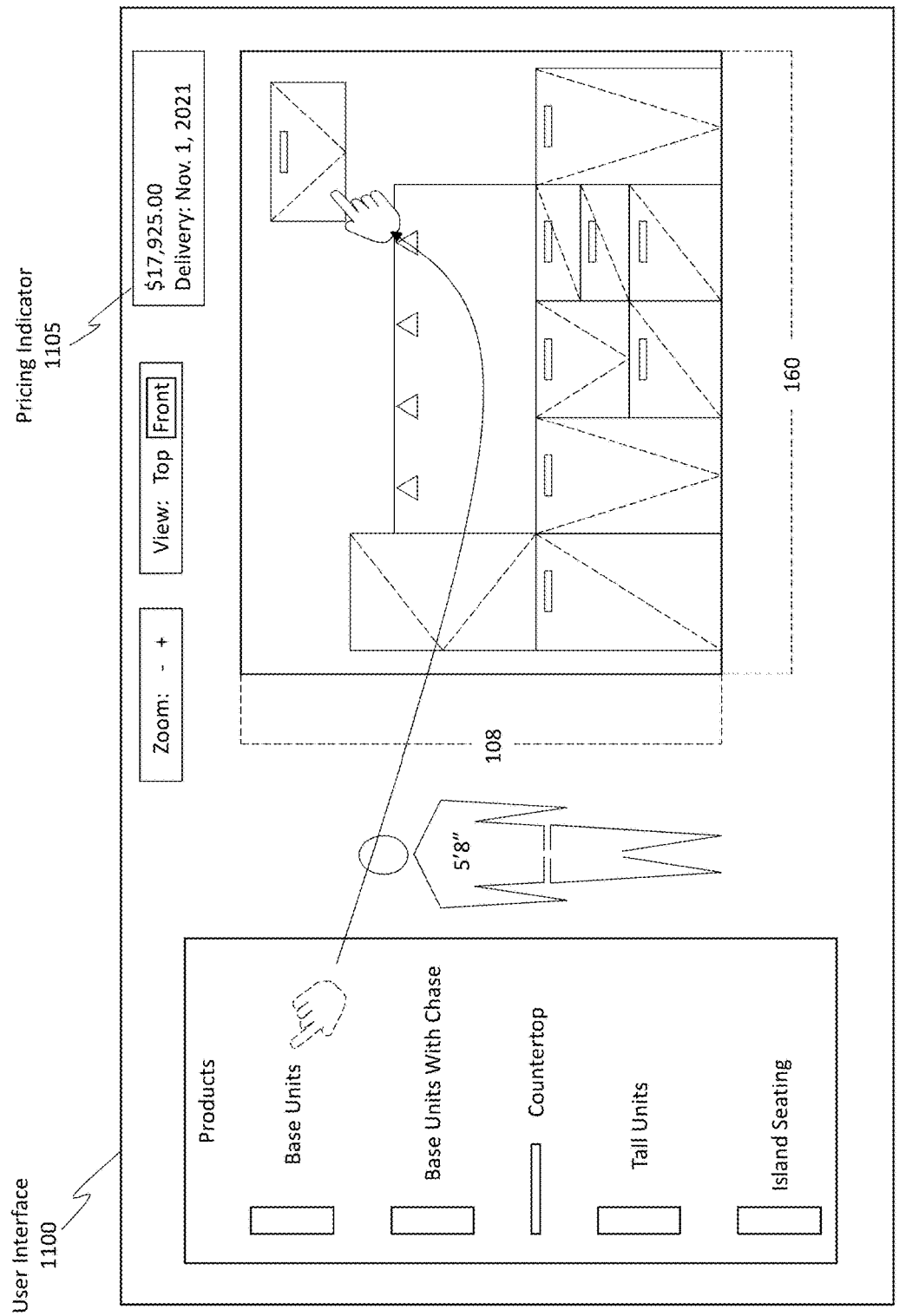
FIG. 11 illustrates how the pricing indicator is updated based on the addition or removal of items in the design layout area.

FIG. 10 shows a user interface 1000 that includes a pricing indicator 1005. The pricing indicator 1005 currently lists the price of the items that are currently included in the design layout area. That is, the pricing indicator 1005 provides an aggregate price for all the items that are currently in use at the design layout area. As items are added or removed from the design layout area, the pricing indicator will be adjusted accordingly. FIG. 11 is illustrative.

FIG. 11 shows a user interface 1100 that is similar to the user interface 1000 of FIG. 10. Here, however, a user has dragged and dropped a new item into the design layout area. Based on the inclusion of this new item, the pricing indicator 1105 has changed the displayed price. Previously, the price was listed at $16,745.00, but now the price is listed at $17,925.00.

Figure 12:
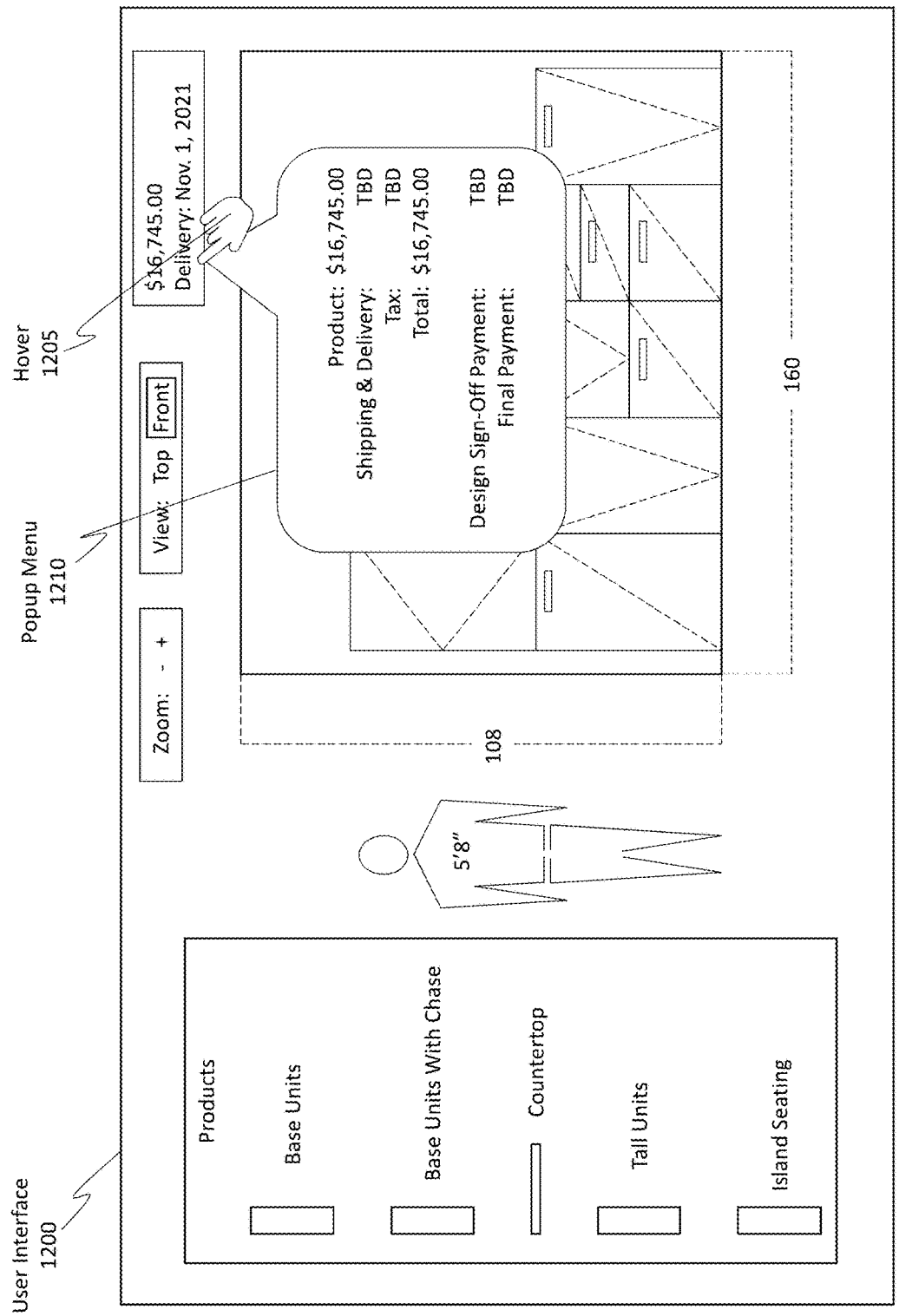
FIG. 12 illustrates how additional information, including additional pricing information, can be displayed.

FIG. 12 shows a user interface 1200 capable of displaying additional pricing information. For instance, in response to a user hovering a cursor over the pricing indicator (e.g., as shown by hover 1205), a popup menu 1210 can be displayed, where the popup menu 1210 can display any number of additional data points corresponding to the price or corresponding to other relevant information (e.g., shipping information, payment information, etc.).

Figure 13:
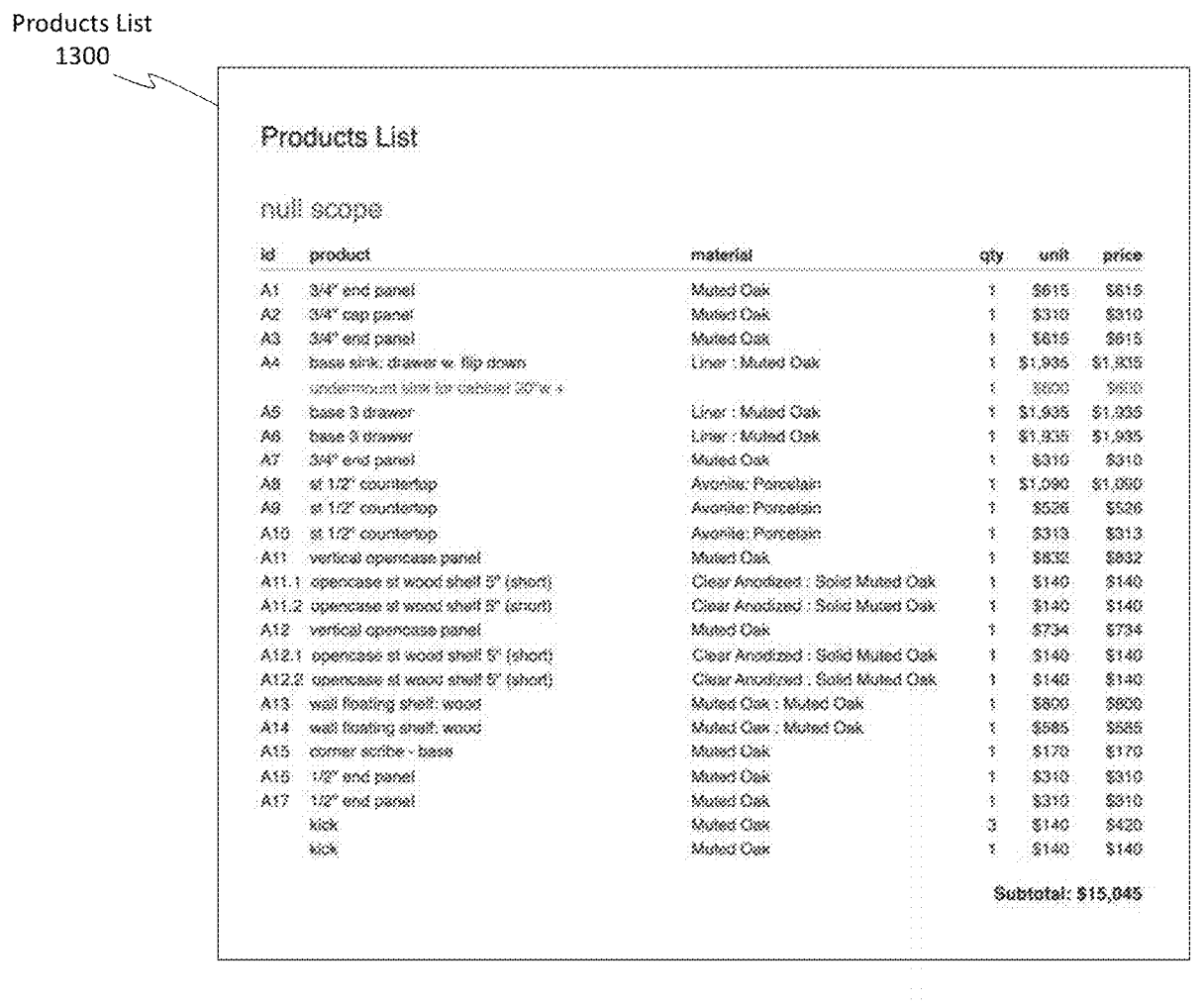

The embodiments are also able to generate a listing of items that are currently in use by the design layout area, as shown by the products list 1300 in FIG. 13. The products list 1300 can include the name of the product, the material used for that product, the quantity of that product, the cost per unit, the cost per quantity, and the overall cost. In some cases, additional cost information can be included in the products list 1300, where such information can include installation prices, taxes, insurance, and so on.

Adding a Scribe

Figure 14A:
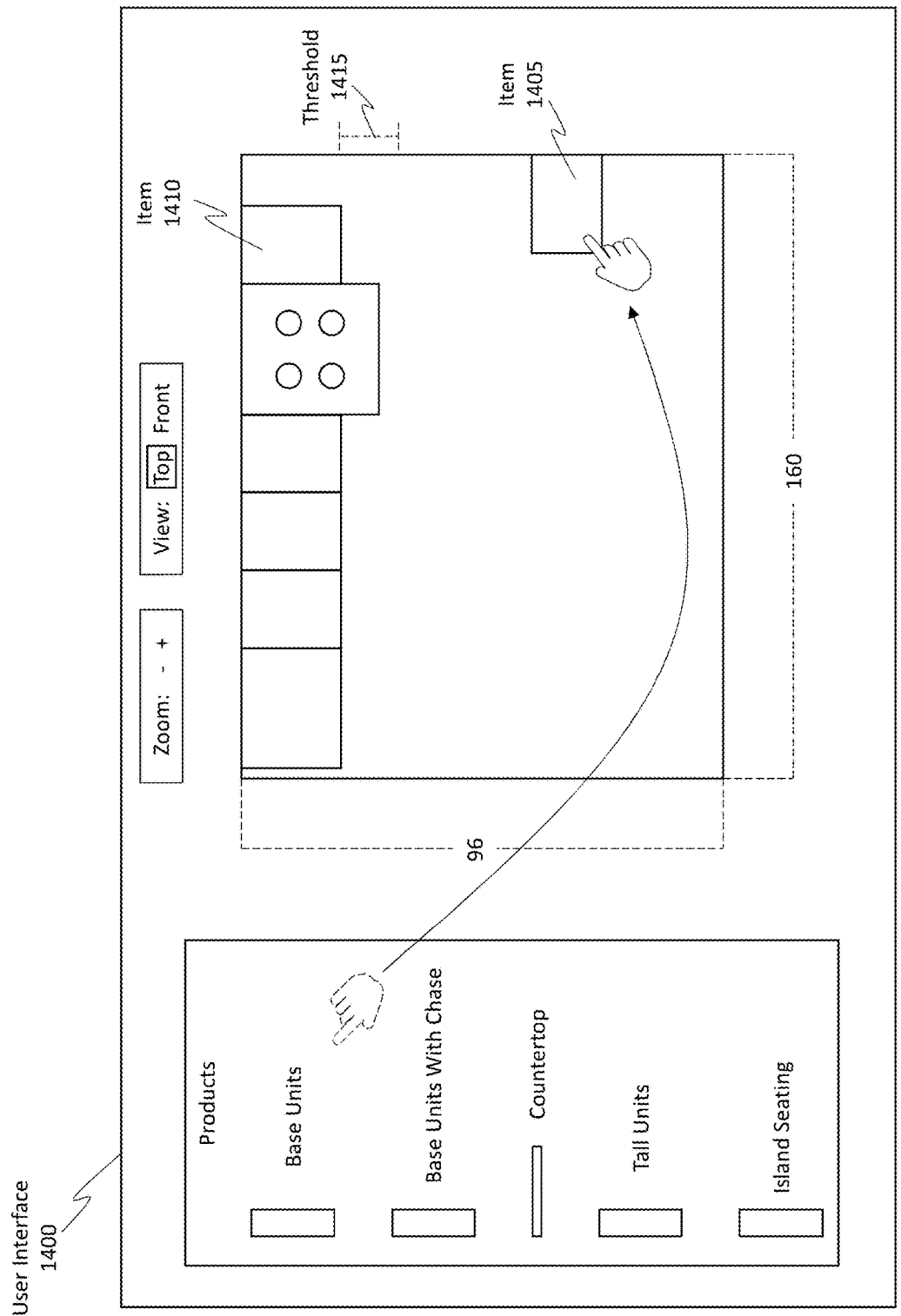
FIGS. 14A, 14B, and 14C illustrate how, when one item it brought within a threshold distance of another item, a scribe can be automatically generated to bridge a gap that exists between those two items.
Figure 14B:
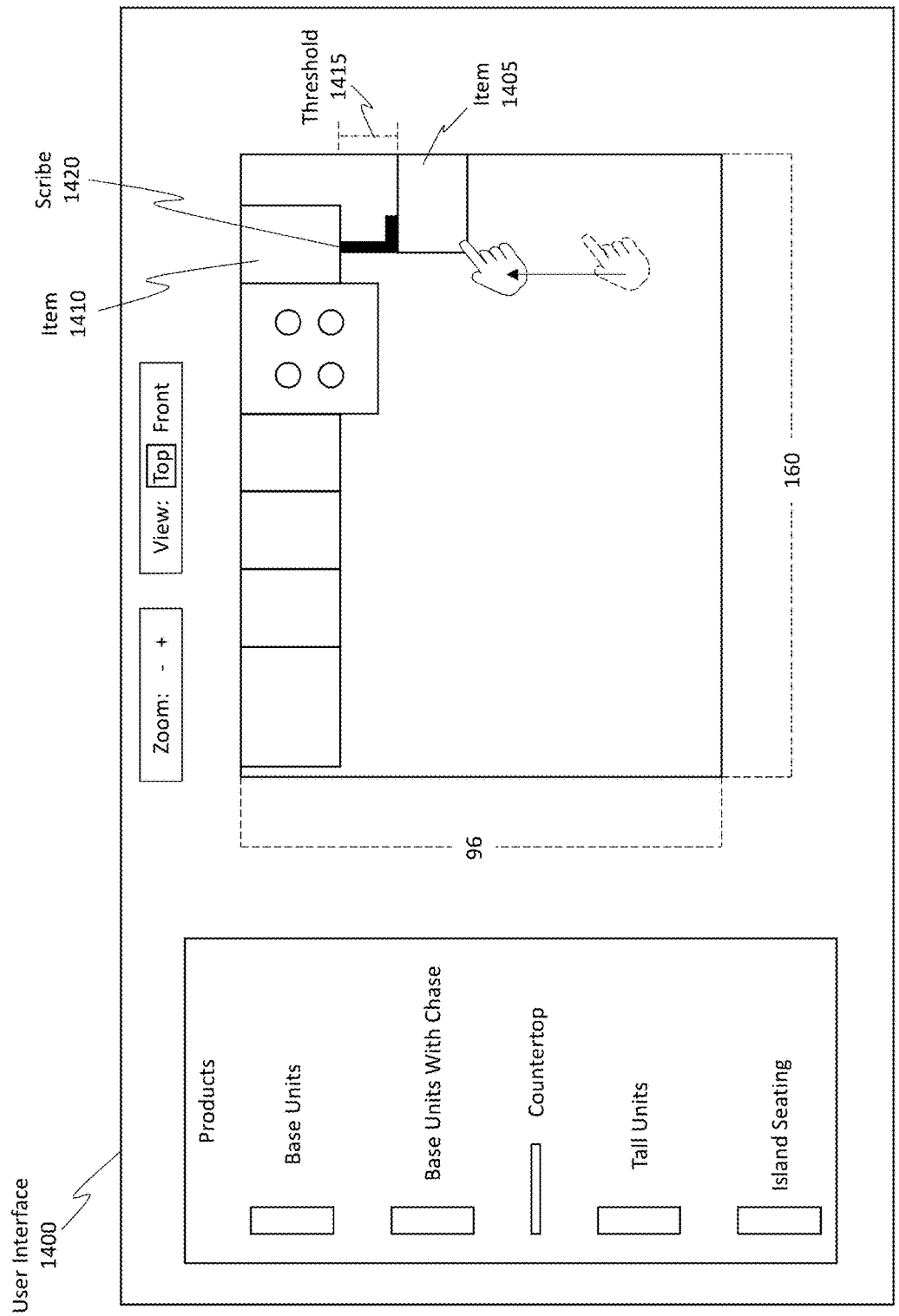
Figure 14C:
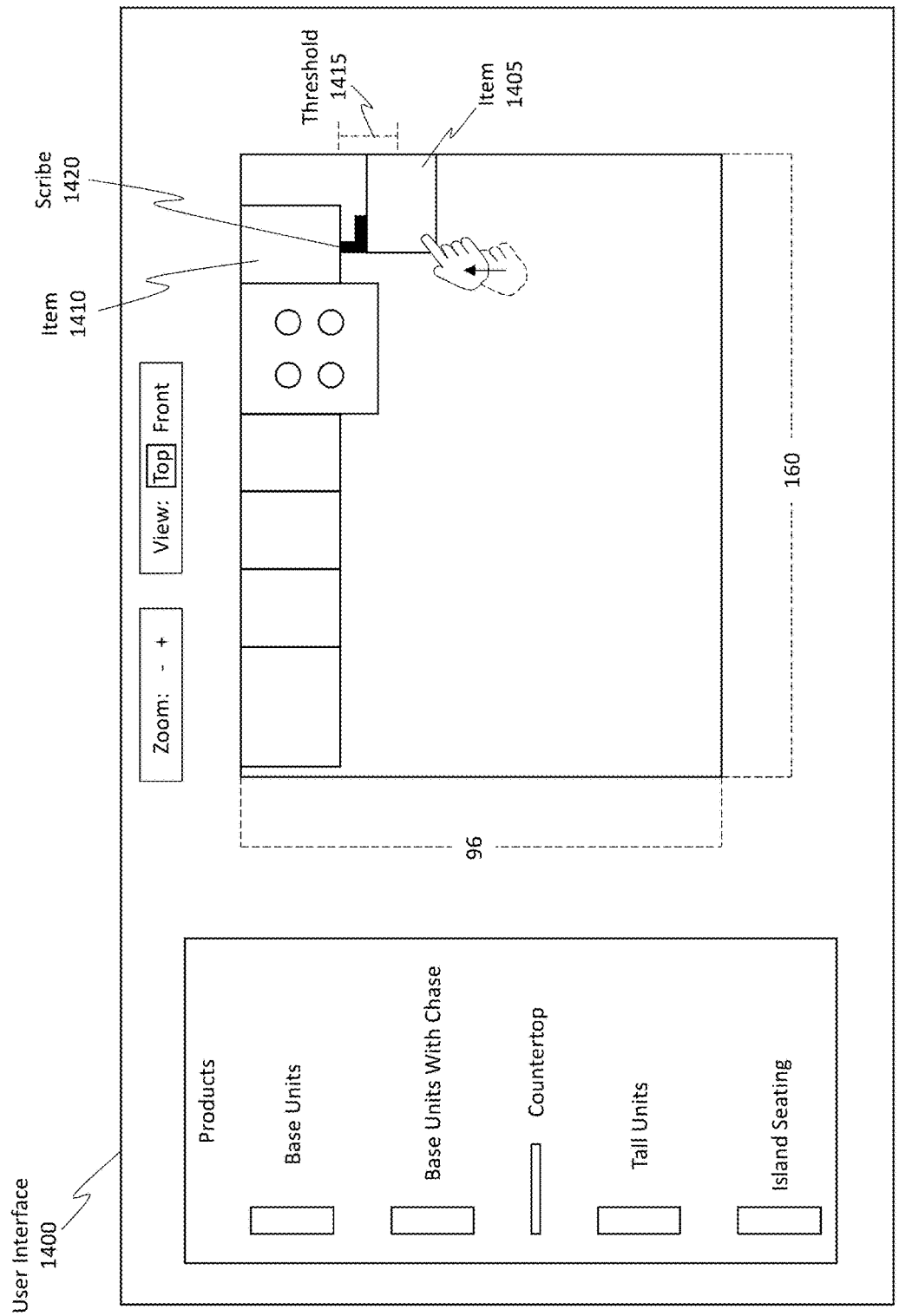

When an item is placed within a threshold distance of another item and when a gap exists between those two (or more) items, it is often beneficial to add what is called a "scribe" to fill in the gap between those items. FIGS. 14A, 14B, and 14C are illustrative.

FIG. 14A shows an example user interface 1400, which is representative of the UIs mentioned thus far. Here, a user has selected an item 1405 from the item selection menu and dragged that item 1405 into the design layout area near another item 1410. In accordance with at least some of the disclosed embodiments, one or more rules can be defined to establish a threshold 1415. When a first item is placed within a threshold proximity to a second item, then the embodiments can trigger the automatic creation of a so-called "scribe," which is another type of item designed to bridge any gaps that might exist between the first item and the second item.

Notably, the rules can be tailored so that the scribe is generated for any type of item or it can optionally be triggered for only select types of items. For instance, the scribe might be triggered when a countertop is brought within the threshold distance of another countertop, but the scribe might not be triggered when an appliance is brought within the threshold distance of another appliance. Indeed, the rules can specify under what circumstances or conditions the scribe will be automatically triggered. In FIG. 14A, the item 1405 was not placed within the threshold 1415 distance relative to the item 1410. As a consequence, no scribe was triggered. Additionally, the size of threshold 1415 can be set to any value.

In some instances, the generation of a scribe occurs when multiple products are brought within a threshold distance of one another. In some instances, the generation of a scribe can occur when a product is brought within a threshold distance of a wall or some other fixture. As an example, if a counter is placed within a defined threshold of a wall, then a scribe can be automatically added. Accordingly, scribes can be generated when multiple products are placed proximately to one another and/or when one or more products are placed proximately to a wall or to some other defined feature. FIG. 14B provides additional details regarding how scribes operate.

In FIG. 14B, the user is shown as moving the item 1405 to a location more proximate to the item 1410. In fact, in this scenario, the item 1405 is now located within the threshold 1415 distance relative to the item 1410. As a consequence, the embodiments can automatically generate a scribe 1420, which is an additional item designed to bridge a gap that might exist between a combination of two or more items. The scribe can, for example, be a customized drawer and countertop unit. The scribe can also be a customized cabinet unit. Indeed, the scribe can be any type of customized unit/item designed to fit in between two or more items that are within a threshold distance relative to one another. The characteristics of the scribe can be customized so as to match the characteristics of one, both, or any number of items to which it is proximate.

For instance, suppose item 1405 and item 1410 are both white drawers. The scribe 1420 can be customized to match the color and material of those two items. Additionally, or alternatively, the user can have control over the appearance and composition characteristics of the scribe. Additionally, while the attributes of the scribe 1420 can be automatically customized, the user also has free control to make additional customizations or changes. The user can also delete the automatically generated scribe, if so desired.

FIG. 14C shows how the size of the scribe 1420 can change based on how closely item 1405 is relative to item 1410. The closer in proximity for the items, the smaller the scribe. The farther in proximity for the items, the larger the scribe. The size of the scribe can increase until such time as the threshold 1415 is exceeded. Additionally, if the user positions the items so they are in contact with one another, then no scribe is needed. One will appreciate how the pricing indicator mentioned earlier can also be updated based on the presence or absence of the scribe, as well as based on the size and customizations of the scribe.

Accordingly, an item can be placed at a particular location within the design layout area. In some cases, this particular location might be within a threshold distance of a second item but does not contact the second item. As a consequence, a gap will exist between the item and the second item. Optionally, a scribe can be generated to bridge the gap. In some cases, the size of the scribe can be adjusted when the item is moved within the design layout area.

Moving Items Based on Rules

Figure 15A:
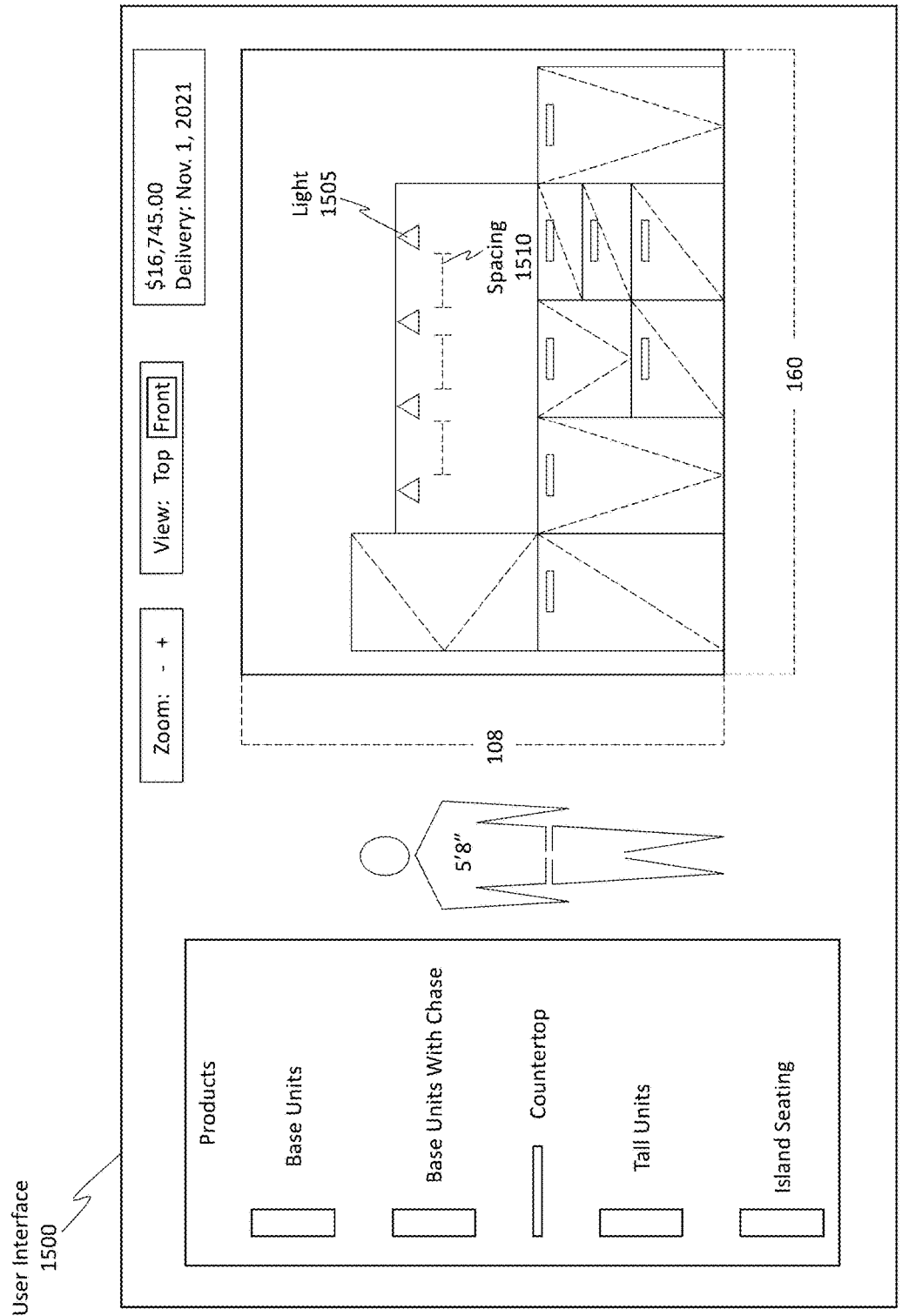
FIGS. 15A, 15B, and 15C illustrate how spacing between rules can be automatically modified when a new item is placed in the design layout area and how the spacing is governed by rules.
Figure 15B:
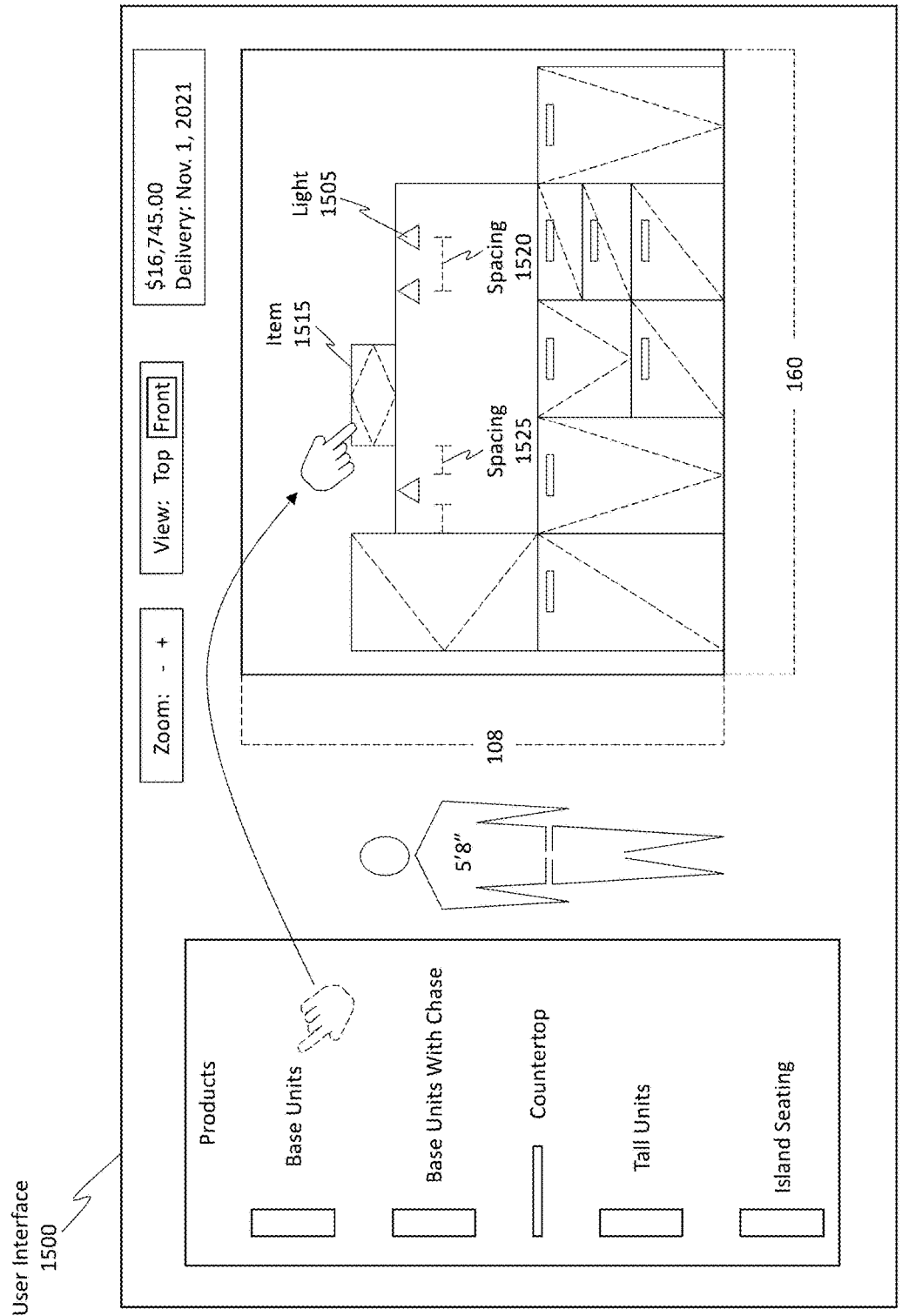
Figure 15C:
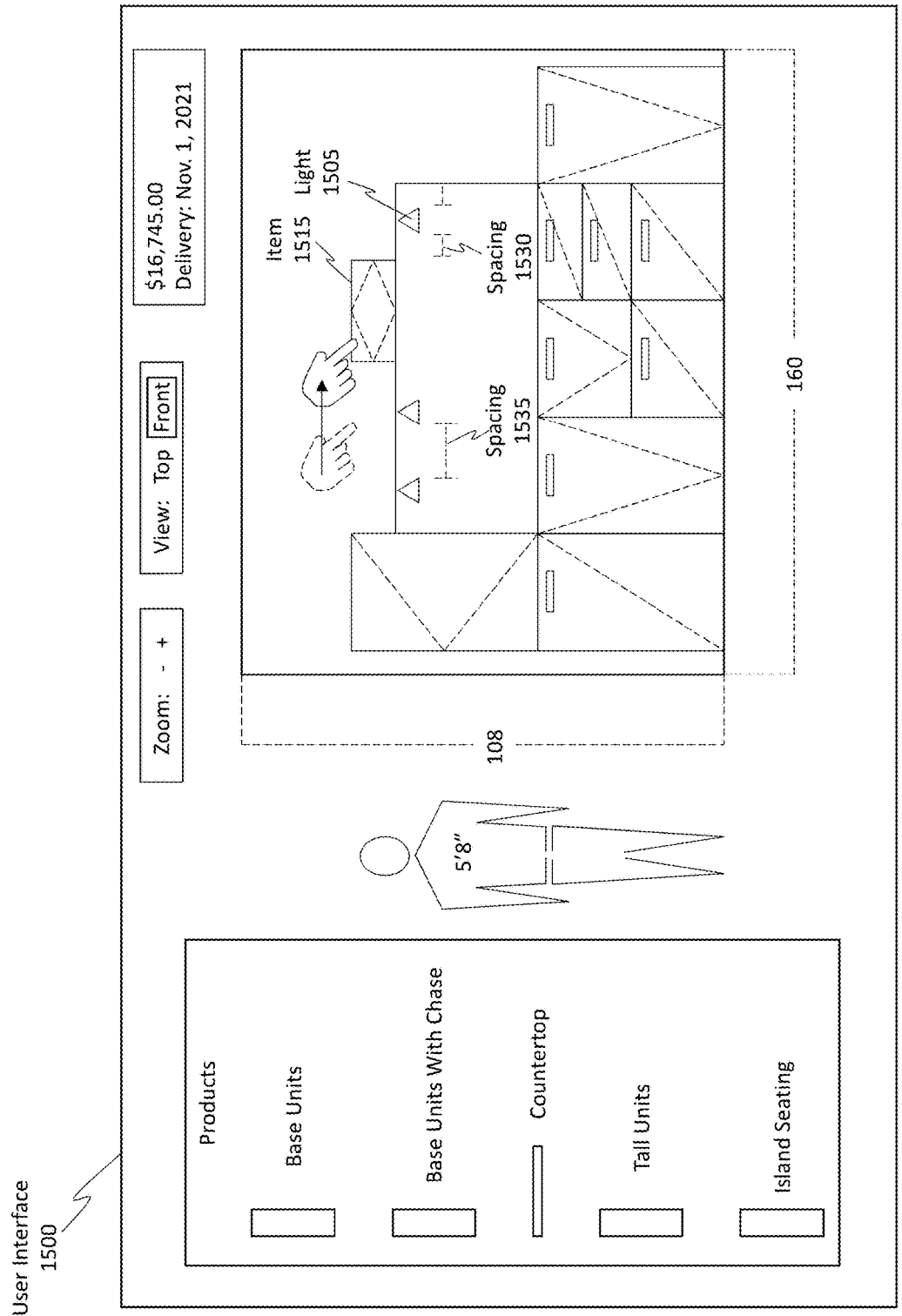

As discussed throughout this disclosure, the embodiments allow for users to define an unlimited number of different types of rules. In one example scenario, a set of one or more rules can be defined to control the automatic placement, movement, and spacing of existing items when a new item is placed within the design layout area. FIGS. 15A, 15B, and 15C are illustrative.

FIG. 15A shows a user interface 1500 where a set of lights (including light 1505 item) has been placed in the design layout area. Here, there are four lights, and each of those lights is spaced a same distance from one another, as shown by spacing 1510.

In FIG. 15B, a user has placed a new item 1515 into the design layout area. The location of this new item 1515 is over top of the lights. As an example, the new item 1515 might be a range hood. The rules can be tailored to dictate that lights should not be underneath of a hood. Based on the defined rules, the embodiments can automatically shift the placement of the existing lights to ensure that no lights are underneath of the item 1515. In the scenario shown in FIG. 15B, the embodiments automatically removed one light and shifted the remaining three lights. For instance, a new spacing paradigm is followed, as shown by spacing 1520 and spacing 1525. Here, the embodiments have shifted the lights to positions so that the space between some of those lights is uniform. Notice, the spacing 1520 is different than the spacing 1525 to ensure that the lights are centered within their respective regions. The rules can be defined to ensure this "centered" approach. Of course, other rules can be defined to accommodate other desires.

In FIG. 15C, the user is shifting the position of the item 1515 to the right. In response to this new position, the rules are triggered, resulting in the movement of a light from the right-hand position over to the left-hand position. The spacing is also now different, as reflected by the spacing 1530 and 1535, which are different relative to one another but which result in the lights being positioned at center positions relative to the available space.

From this disclosure, one will appreciate how the embodiments can enable a user to define a set of rules governing the placement of items. The rules can control where and how an item is placed within the design layout area. The rules can also control how other items react when a new item is placed in the design layout area. Indeed, some rules cause some existing items to move in response to a new item being added while other rules cause some existing items to remain in place while the new item is moved and/or modified.

Additional Example Methods

Figure 16:
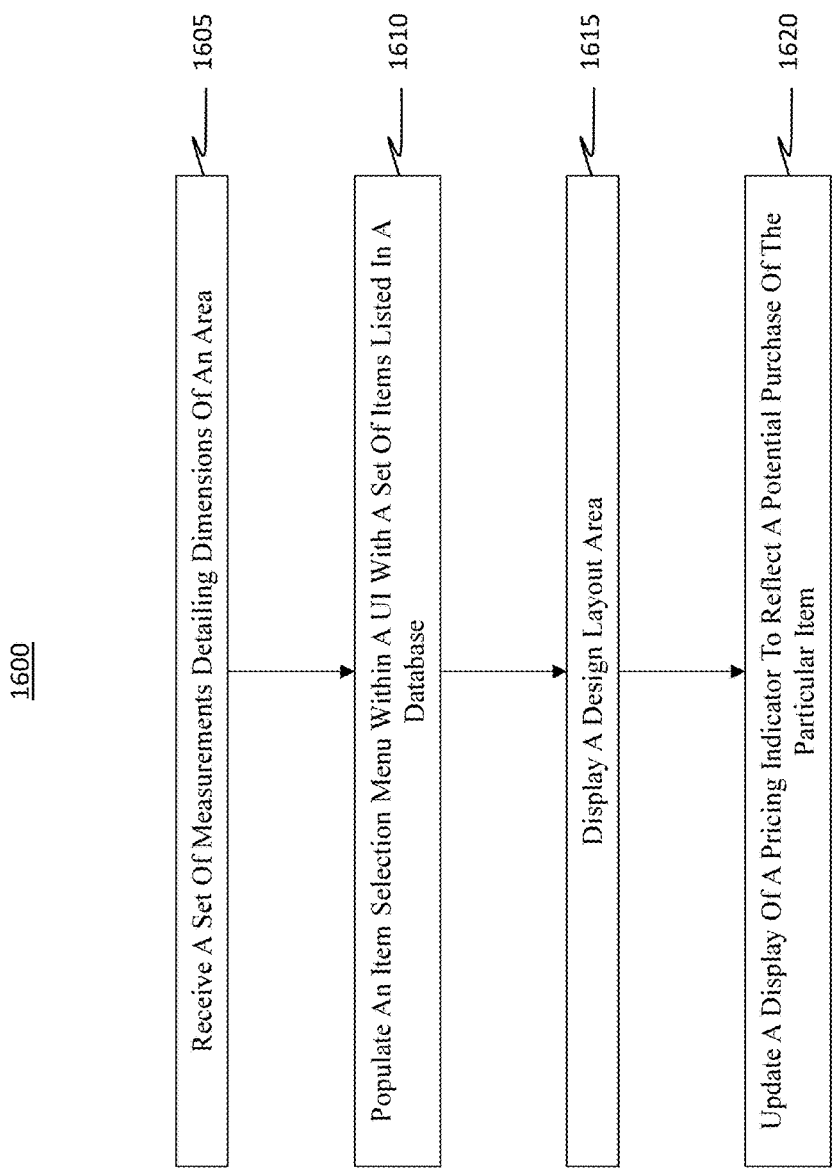
FIG. 16 illustrates a flowchart of an example method for modifying a pricing indicator based on changes to items in the design layout area.

Attention will now be directed to FIG. 16, which illustrates a flowchart of an example method 1600 for providing a UI designed to facilitate organization of items within a defined enclosure, where placement or removal of the items within the defined enclosure triggers automatic update of a pricing UI element that is displayed in the UI. Method 1600 can be implemented in the architecture 200 of FIG. 2 (e.g., by the design engine 210). Furthermore, the user interfaces 1000 of FIG. 10, 1100 of FIG. 11, and 1200 of FIG. 12 are particularly indicative of the method 1600.

Method 1600 includes an act (act 1605) of receiving a set of measurements detailing dimensions of an area. In act 1610, an item selection menu within a UI is populated with a set of items listed in a database. The database provides a corresponding set of dimensions for each item in the set of items. Act 1615 involves displaying, within the UI, a design layout area. The design layout area is configured to virtually represent the area such that dimensions of the design layout area are proportional to the dimensions of the area.

In response to a particular item being selected from the item selection menu and being placed at a particular location within the design layout area, act 1620 includes updating a display of a pricing indicator to reflect a potential purchase of the particular item. For instance, the pricing indicator 1005 of FIG. 10 is illustrative. A price of the particular item is also included in the database.

In some cases, the pricing indicator is updated when any item currently placed in the design layout area is removed from the design layout area. Another option is available when a cursor is hovered over the pricing indicator. That is, a popup information indicator (e.g., popup menu 1210 in FIG. 12) can be displayed and can display additional pricing information.

Figure 17:
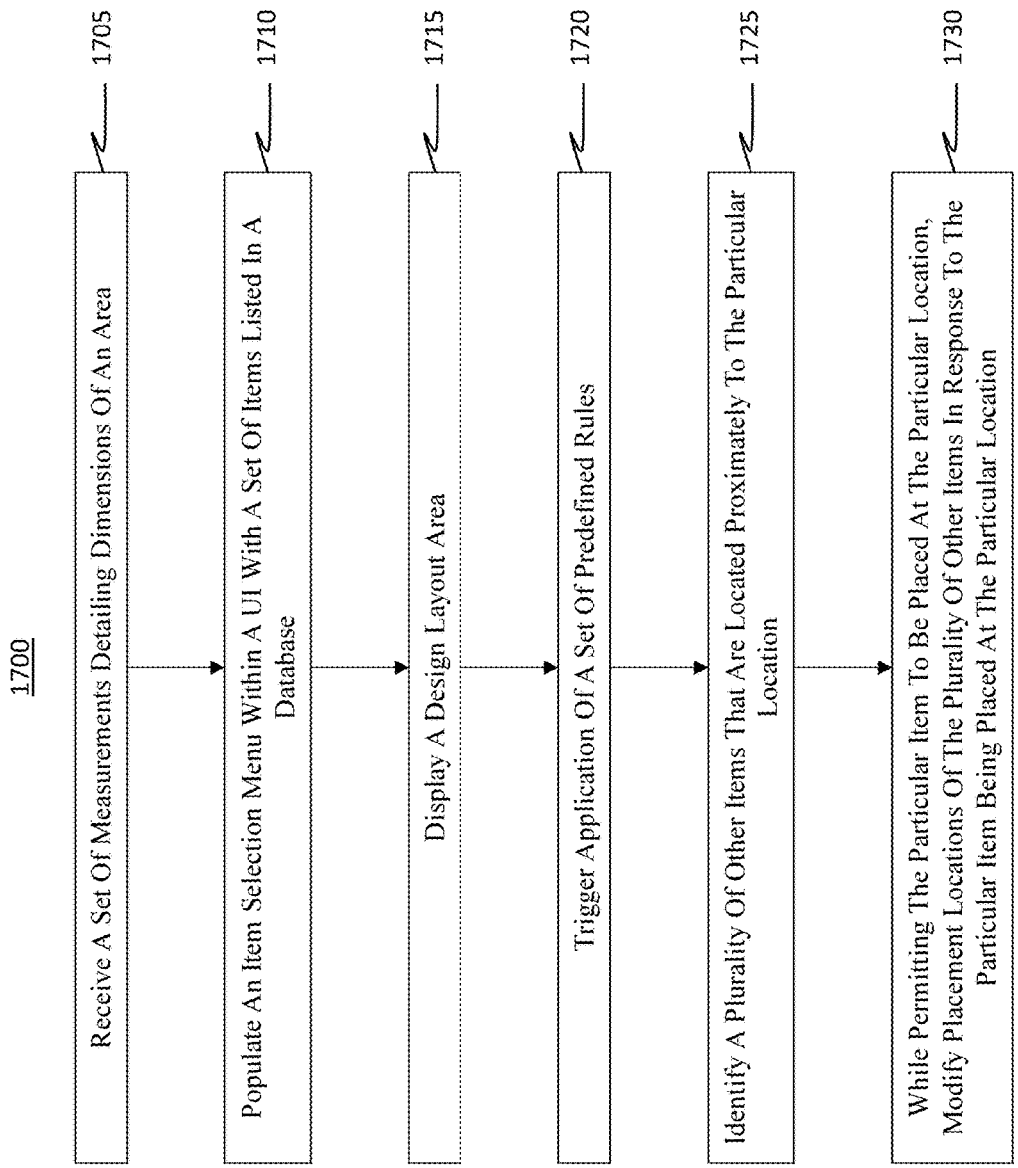
FIG. 17 illustrates a flowchart of an example method for automatically modifying the placement locations of items.

FIG. 17 shows another flowchart of an example method 1700 for providing a UI designed to facilitate organization of items within a defined enclosure, where placement of the items within the defined enclosure is governed, at least in part, by a set of predefined rules. Method 1700 can also be performed within the architecture 200 of FIG. 2 (e.g., by the design engine 210). FIGS. 15A, 15B, and 15C are illustrative of method 1700.

Initially, act 1705 includes receiving a set of measurements detailing dimensions of an area. Act 1710 involves populating an item selection menu within a UI with a set of items listed in a database. The database provides a corresponding set of dimensions for each item in the set of items. Act 1715 includes displaying, within the UI, a design layout area. The design layout area is configured to virtually represent the area such that dimensions of the design layout area are proportional to the dimensions of the area.

In response to a particular item being selected from the item selection menu and being placed at a particular location within the design layout area, act 1720 involves triggering application of a set of predefined rules. The set of predefined rules governs placement of items within the design layout area. In act 1725, the embodiments identify a plurality of other items that are located proximately to the particular location. For instance, FIG. 15B shows an item being placed in the design layout area. The lights can be considered as the "other items" mentioned above. These lights are located proximately to the location of item 1515 in FIG. 15B.

While permitting the particular item to be placed at the particular location, the embodiments modify (e.g., act 1730) placement locations of the plurality of other items in response to the particular item being placed at the particular location. The process of modifying the placement locations of the plurality of other items is based on the set of predefined rules. For instance, FIGS. 15B and 15C show how the placement locations of the lights are modified based on the placement location of the item 1515.

Optionally, the set of predefined rules can include spacing requirements indicating how the other items are to be spaced relative to one another. Other rules can be defined to govern other aspects of the items.

In some implementations, a set of drawings can be generated based on the items currently included in the design layout area. For instance, the drawings can be architectural blueprint drawings or even a computer aided design (CAD) set of drawings. The drawings can be exported and provided to other users.

In some cases, the set of rules can include the requirement for a buffer region around a particular item. For instance, a range may need a buffer on the back end to ensure that the range can be plugged into an electrical outlet. Therefore, defined buffers can be provided for any number or type of item. This buffer can be implemented for use against a wall or even against another item.

Invoices and price sheets can also be generated based on the list of items that are currently included in the design layout area. Those invoices can be dynamically modified based on changes to the layout. Additionally, as mentioned previously, certain items might be scalable and have pre-defined sizes that are adjustable. When the item changes in size, then the pricing indicator can be updated to reflect the changes in price that might accompany the change in size.

A rule can be implemented to "merge" one item with another item. For instance, suppose an island is dropped into the design layout area. Further suppose a cantilevered counter is added next to the island. Because of the relationship between these two items (e.g., one can be dependent on the other, such as to provide a base of support for the cantilevered counter), the embodiments can automatically merge these items together to form a group.

In this sense, the disclosed embodiments include an improved type of user interface. This UI is designed to beneficially help users perform interior design and decoration. The UI is intuitively arranged with an optimal layout to help the user in the design process.

In some example scenarios, the embodiments can receive input from the user, where that input specifies certain desires or requirements that the design engine is to adhere to. As an example, a user might be provided with a fill-in-the-blank template listing a number of questions. The embodiments can dynamically generate a proposed design based on the answers the user provides to the questions.

Optionally, the design engine can generate one or more proposed arrangements of the items for the specific room. In some cases, the requirements can be functional in nature. One example of a functional requirement can be "it is desired that the kitchen be arranged to comfortably allow at least three people to work in the kitchen." The design engine can receive this data and then design a kitchen layout that is spaced in a manner so as to comfortably allow three people to work therein. The design engine can determine that, based on the indicated requirements, a certain amount of storage and appliances will be needed and will need to be spaced certain distances away from one another, such as perhaps the requirement that one appliance is within arm's reach of another appliance.

In another example scenario, the design engine can receive a listing of desired items as well as the room measurements. Based on that data, the design engine can then generate a list of possible arrangements or layouts for the room, where the room will be populated using the items in the list. As an example, one possible arrangement might configure a sofa as being placed along one wall while another possible arrangement might configure the sofa as being placed along a different wall.

Issue avoidance can also be performed by the disclosed embodiments. For instance, the embodiments can detect when obstructions or other possible issues might develop based on the current or tentative arrangement. An example of an issue might occur when certain products tend to conflict with one another for some reason. Another example of a potential issue deals with appearance aspects, such as one configuration might be more visually pleasing and functional than another configuration. When such issues arise, an alarm or alert can be triggered to inform the user of the possible negative condition.

As another example, a user can enter information such as the following: "design a kitchen for a family of four with the primary needs of baking and socializing." The disclosed embodiments are able to make a layout recommendation based on the specified conditions. The fill-in-the-blank template or questionnaire can include questions such as "how many people reside at this location" or "how many individuals cook together." Designs can be customized based on the answers to the questions. Accordingly, the embodiments can propose improvements to configurations to address aesthetic goals, functional goals, or issue avoidance goals.

The embodiments can also maintain a template of sample designs that have proven to work well for other rooms. In accordance with the disclosed principles, these sample templates can also be provided as proposals to users. Furthermore, different templates can be created for differently configured rooms or areas. The embodiments also provide for the automatic and/or trained identification of various design patterns based on specified conditions (e.g., room layout, functionality, etc.). Such patterns can be retained in a database, which can further include previously generated designs so that it can display multiple options to users who have answered a set of questions. Additionally, the embodiments provide value engineering designs, where a recommendation satisfies a desired functional goal while also satisfying a specified cost limit or condition.

Different profiles or accounts can also be generated. As an example, the disclosed embodiments can provide a private tool for individuals, customers, business entities, or even administrators of the application, where restrictions are set so as to control which entities are permitted to view a client's information. In some cases, a public tool can also be made available, where optionally no such restrictions are put in place. Users can establish profiles and can set various permissions to control access to information and designs. In some cases, the disclosed tools and applications can be provided via a web interface (e.g., a software as a service application) or, optionally, via a locally executed program.

The disclosed embodiments are also configured to enable products to dynamically change in shape or size based on the defined environment or architecture. As described previously, products can change in size when placed near other products. Additionally, the embodiments can export a file containing a design, and that file can be used or is supported by any number of architectural specification software.

Example Computer/Computer Systems

Figure 18:
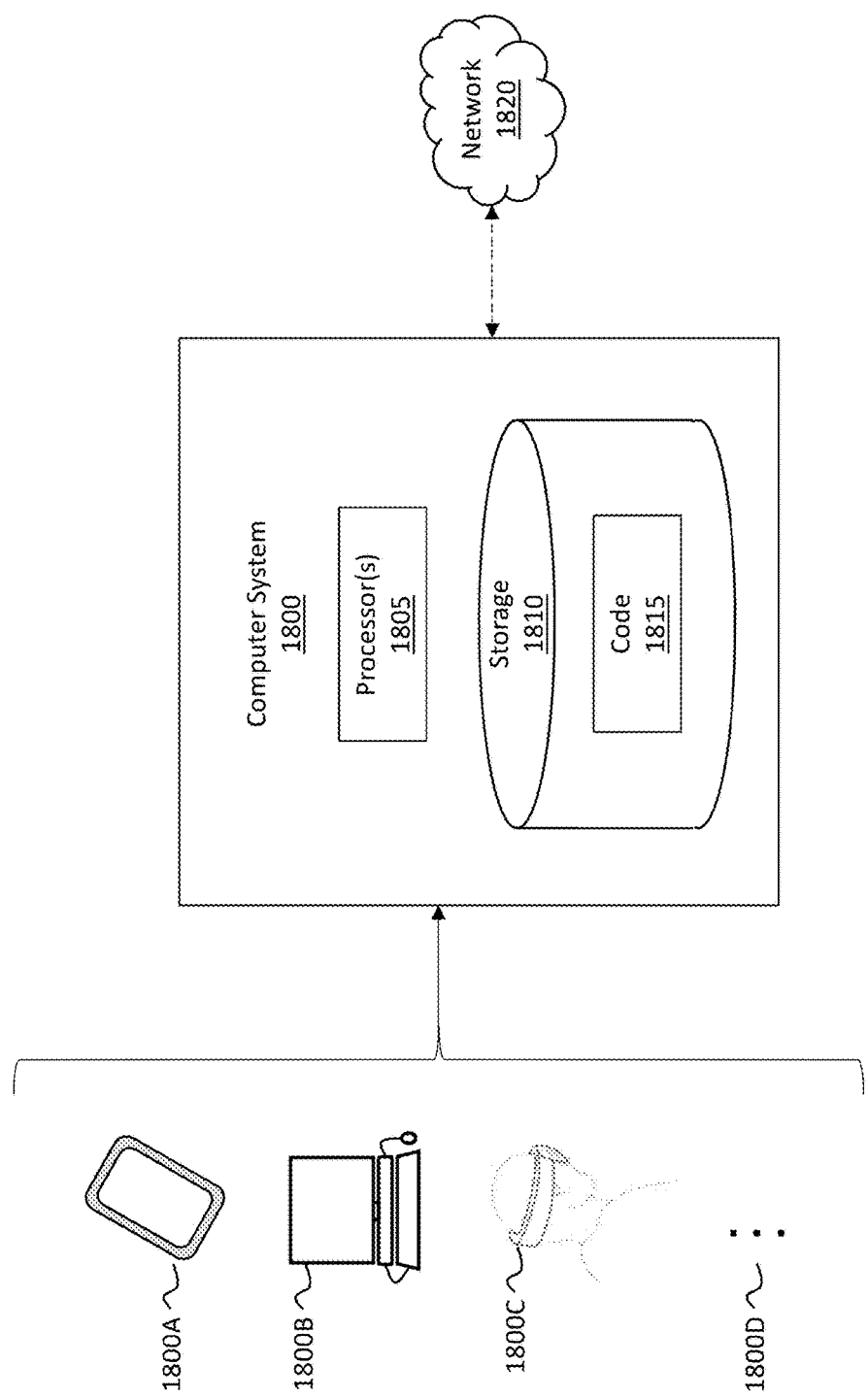
FIG. 18 illustrates an example computer system designed to perform any of the disclosed operations.

Attention will now be directed to FIG. 18 which illustrates an example computer system 1800 that may include and/or be used to perform any of the operations described herein. Computer system 1800 may take various different forms. For example, computer system 1800 may be embodied as a tablet 1800A, a desktop or a laptop 1800B, a wearable device 1800C, a mobile device, a standalone device, or any other device, as shown by the ellipsis 1800D. Computer system 1800 may also be a distributed system that includes one or more connected computing components/devices that are in communication with computer system 1800.

In its most basic configuration, computer system 1800 includes various different components. FIG. 18 shows that computer system 1800 includes one or more processor(s) 1805 (aka a "hardware processing unit") and storage 1810.

Regarding the processor(s) 1805, it will be appreciated that the functionality described herein can be performed, at least in part, by one or more hardware logic components (e.g., the processor(s) 1805). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1800. The different components, modules, engines, and services described herein may be implemented as objects or processors that execute on computer system 1800 (e.g. as separate threads). The design engine 210 from FIG. 2 (or perhaps even just the processor(s) 1805) can be configured to perform any of the disclosed method acts or other functionalities.

Storage 1810 may be physical system memory, which may be volatile, non-volatile, or some combination of the two. The term "memory" may also be used herein to refer to non-volatile mass storage such as physical storage media. If computer system 1800 is distributed, the processing, memory, and/or storage capability may be distributed as well.

Storage 1810 is shown as including executable instructions 1815. The executable instructions 1815 represent instructions that are executable by the processor(s) 1805 (or perhaps even the design engine 210) of computer system 1800 to perform the disclosed operations, such as those described in the various methods.

The disclosed embodiments may comprise or utilize a special-purpose or general-purpose computer including computer hardware, such as, for example, one or more processors (such as processor(s) 1805) and system memory (such as storage 1810), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1800 may also be connected (via a wired or wireless connection) to external sensors (e.g., one or more remote cameras) or devices via a network 1820. For example, computer system 1800 can communicate with any number devices or cloud services to obtain or process data. In some cases, network 1820 may itself be a cloud network. Furthermore, computer system 1800 may also be connected through one or more wired or wireless networks 1820 to remote/separate computer systems(s) that are configured to perform any of the processing described with regard to computer system 1800.

A "network," like network 1820, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1800 will include one or more communication channels that are used to communicate with the network 1820. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing a user interface (UI) designed to facilitate organization of items within a defined enclosure, wherein placement of the items within the defined enclosure is governed, at least in part, by a set of predefined rules, said method comprising:
    receiving a set of measurements detailing dimensions of an area;
    populating an item selection menu within a UI with a set of items listed in a database, wherein the database provides a corresponding set of dimensions for each item in the set of items;
    displaying, within the UI, a design layout area, wherein the design layout area is configured to virtually represent the area such that dimensions of the design layout area are proportional to the dimensions of the area;
    in response to a particular item being selected from the item selection menu and being placed at a particular location within the design layout area, trigger application of a set of predefined rules, wherein the set of predefined rules governs placement of items within the design layout area; and
    determine that placement of the particular item at the particular location does not violate the set of predefined rules and permit the placement or, alternatively, determine that the placement of the particular item at the particular location does violate the set of predefined rules and display one or more alternative suggestions, wherein the one or more alternative suggestions include one or more of a first suggestion indicating where the particular item can alternatively be placed within the design layout area so as to not violate the set of predefined rules or a second suggestion indicating how the particular item can alternatively be structured so as to be placed at the particular location without violating the set of predefined rules, and
    wherein the particular location is within a threshold distance of a second item but does not contact the second item such that a gap exists between the particular item and the second item, and wherein a scribe is generated to bridge the gap.

2. The method of claim 1, wherein the UI displays the particular item in a two-dimensional manner.

3. The method of claim 1, wherein the UI displays the particular item in a three-dimensional manner.

4. The method of claim 1, wherein a machine learning engine generates the one or more suggestions.

5. The method of claim 1, wherein the set of items includes a countertop, a shelf, an island, and a cooking range.

6. The method of claim 1, wherein the UI displays the dimensions of the area.

7. The method of claim 1, wherein dimensions for the particular item are also displayed by the UI and are displayed at locations proximate to the particular item.

8. The method of claim 1, wherein the UI provides a top aerial view of the design layout area or, alternatively, a front-facing view of the design layout area.

9. The method of claim 1, wherein the UI displays, simultaneously, both the first suggestion and the second suggestion.

10. A method for providing a user interface (UI) designed to facilitate organization of items within a defined enclosure, wherein placement or removal of the items within the defined enclosure triggers automatic update of a pricing UI element that is displayed in the UI, said method comprising:

receiving a set of measurements detailing dimensions of an area;

populating an item selection menu within a UI with a set of items listed in a database, wherein the database provides a corresponding set of dimensions for each item in the set of items;

displaying, within the UI, a design layout area, wherein the design layout area is configured to virtually represent the area such that dimensions of the design layout area are proportional to the dimensions of the area; and in response to a particular item being selected from the item selection menu and being placed at a particular location within the design layout area, update a display of a pricing indicator to reflect a potential purchase of the particular item, wherein a price of the particular item is also included in the database, and wherein the particular location is within a threshold distance of a second item but does not contact the second item such that a gap exists between the particular item and the second item, and wherein a scribe is generated to bridge the gap.

11. The method of claim 10, wherein a size of the scribe adjusts when the particular item is moved within the design layout area.

12. The method of claim 10, wherein the pricing indicator is updated when any item currently placed in the design layout area is removed from the design layout area.

13. The method of claim 10, wherein, when a cursor is hovered over the pricing indicator, a popup informational indicator is displayed, the popup informational indicator displaying additional pricing information.

14. The method of claim 10, wherein, when the design layout area is configured to provide a front-facing view, a human model is displayed proximately next to but outside of the design layout area, and wherein dimensions of the human model are displayed with the human model.

15. A method for providing a user interface (UI) designed to facilitate organization of items within a defined enclosure, wherein placement of the items within the defined enclosure is governed, at least in part, by a set of predefined rules, said method comprising:

receiving a set of measurements detailing dimensions of an area;

populating an item selection menu within a UI with a set of items listed in a database, wherein the database provides a corresponding set of dimensions for each item in the set of items;

displaying, within the UI, a design layout area, wherein the design layout area is configured to virtually represent the area such that dimensions of the design layout area are proportional to the dimensions of the area;

in response to a particular item being selected from the item selection menu and being placed at a particular location within the design layout area, trigger application of a set of predefined rules, wherein the set of predefined rules governs placement of items within the design layout area;

identifying a plurality of other items that are located proximately to the particular location; and while permitting the particular item to be placed at the particular location, modifying placement locations of the plurality of other items in response to the particular item being placed at the particular location, wherein modifying the placement locations of the plurality of other items is based on the set of predefined rules, and wherein the particular location is within a threshold distance of a second item but does not contact the second item such that a gap exists between the particular item and the second item, and wherein a scribe is generated to bridge the gap.

16. The method of claim 15, wherein the set of predefined rules includes spacing requirements indicating how the plurality of other items are spaced relative to one another.

17. The method of claim 15, wherein the UI displays the particular item in a two-dimensional manner.

18. The method of claim 15, wherein the set of items includes household furnishings, office furnishings, or warehouse furnishings.

19. The method of claim 15, wherein the scribe is generated for a select type of item.

20. The method of claim 15, wherein characteristics of the scribe are customizable.

* * * * *